(12) United States Patent
Payton

(10) Patent No.: US 8,485,027 B2
(45) Date of Patent: Jul. 16, 2013

(54) BOREHOLE FORCE MEASUREMENT

(75) Inventor: Robert Michael Payton, Missouri City, TX (US)

(73) Assignee: Schlumberger Technology Corporation, Sugar Land, TX (US)

(*) Notice: Subject to any disclaimer, the term of this patent is extended or adjusted under 35 U.S.C. 154(b) by 351 days.

(21) Appl. No.: 12/558,895

(22) Filed: Sep. 14, 2009

(65) Prior Publication Data

US 2011/0061455 A1    Mar. 17, 2011

(51) Int. Cl.
*E21B 47/00*    (2006.01)

(52) U.S. Cl.
USPC .......................................... 73/152.59; 702/6

(58) Field of Classification Search
USPC ................ 73/152.59, 382 R, 514.32, 514.18
See application file for complete search history.

(56) References Cited

U.S. PATENT DOCUMENTS

| 4,707,927 A | 11/1987 | Hiyama |
| 5,103,178 A * | 4/1992 | Desbrandes ................. 324/351 |
| 7,743,657 B2 * | 6/2010 | Ito ............................. 73/514.19 |
| 7,782,709 B2 | 8/2010 | Esmersoy |
| 8,113,042 B2 | 2/2012 | Donadille et al. |

FOREIGN PATENT DOCUMENTS

| JP | 4337468 | 11/1992 |
| JP | 2002048813 | 2/2002 |
| JP | 2003121456 | 4/2003 |

OTHER PUBLICATIONS

International Preliminary Report on Patentability of PCT Application Serial No. PCT/US2010/048607 dated Mar. 29, 2012.

* cited by examiner

*Primary Examiner* — Hezron E Williams
*Assistant Examiner* — Rodney T Frank
(74) *Attorney, Agent, or Firm* — Jeremy Berman; John Vereb

(57) ABSTRACT

A technique facilitates the measurements of forces, such as forces that result from gravity and acceleration. The system and methodology utilize a plurality of electrodes that cooperate with a movable electrode. By applying appropriate signals to the electrodes, the movable electrode can be levitated in a manner that creates a sensor system able to accurately detect forces resulting from gravity, acceleration and similar causes.

21 Claims, 6 Drawing Sheets

BOREHOLE FORCE MEASUREMENT

BACKGROUND OF THE DISCLOSURE

Knowledge of subterranean characteristics can be important for oil exploration, gas exploration and other activities that benefit from an enhanced understanding of specific subterranean environments. Various sensors and techniques are used to obtain information related to rock formations, fluid reservoirs, and other features of the subject environment. In some applications, wellbores or other boreholes are drilled and sensors are lowered downhole to help obtain information on surrounding formations.

Various techniques have been employed to obtain gravity measurements that are useful in understanding the features and characteristics of the subterranean region. For example, gravity measurements can be used to determine the densities of the rock and other features surrounding a wellbore. The density data is useful in oil and gas exploration, for example, by helping determine oil and gas distribution throughout a given reservoir region.

BRIEF DESCRIPTION OF THE DRAWINGS

The present disclosure is best understood from the following detailed description when read with the accompanying Figures. It is emphasized that, in accordance with the standard practice in the industry, various features are not drawn to scale. In fact, the dimensions of the various features may be arbitrarily increased or reduced for clarity of discussion.

DETAILED DESCRIPTION

Figure 1:
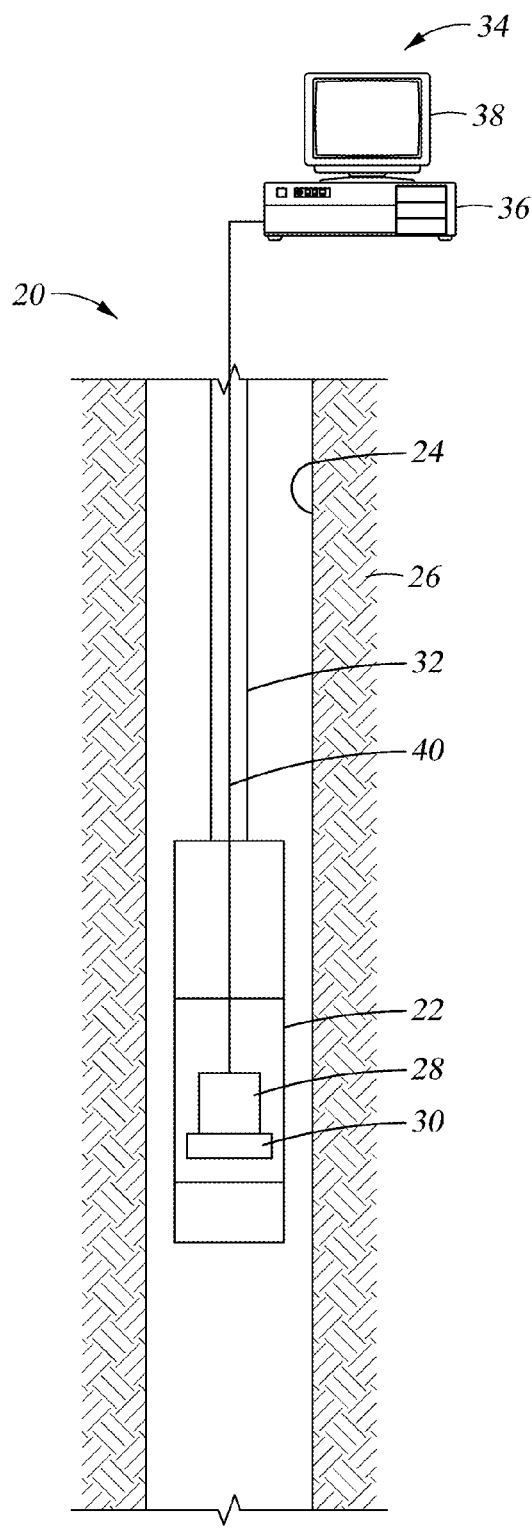
FIG. 1 is a schematic view of apparatus according to one or more aspects of the present disclosure.

It is to be understood that the following disclosure provides many different embodiments, or examples, for implementing different features of various embodiments. Specific examples of components and arrangements are described below to simplify the present disclosure. These are, of course, merely examples and are not intended to be limiting. In addition, the present disclosure may repeat reference numerals and/or letters in the various examples. This repetition is for the purpose of simplicity and clarity and does not in itself dictate a relationship between the various embodiments and/or configurations discussed. Moreover, the formation of a first feature over or on a second feature in the description that follows may include embodiments in which the first and second features are formed in direct contact, and may also include embodiments in which additional features may be formed interposing the first and second features, such that the first and second features may not be in direct contact.

The present disclosure generally relates to a system and methodology for measuring and evaluating forces incurred by an object. For example, the system and methodology can be used for measuring forces of gravity and acceleration imparted to a tool. In some applications, the method is employed via a well tool to measure forces of gravity and/or acceleration acting on the well tool in a subterranean environment, such as a wellbore environment.

Referring generally to FIG. 1, one embodiment of a system 20 for measuring forces, e.g., forces related to gravity and acceleration, is illustrated. By way of example, the system 20 may comprise a well system for determining gravitational forces and/or acceleration forces in a subterranean environment. However, other systems also may be utilized for measuring gravitational forces in other environments. For example, system 20 may comprise a surface sensor system in which forces are measured with tools/meters located at ground level. System 20 also may be a shipborne system or an airborne system located on, for example, a fixed wing aircraft, a helicopter, a dirigible, or on other airborne vehicles. In other applications, system 20 may be a space-based system mounted on, for example, a satellite. In still other applications, system 20 may be a subsea system used in, for example, a submarine, a remotely operated vehicle, an autonomous undersea vehicle, a pressure vessel on the seabed, or on other subsea systems or devices. For purposes of explanation, however, well system 20 is illustrated schematically as positioned in a well in FIG. 1, and the system may comprise a variety of configurations and components. Within subterranean environments, system 20 can be utilized in determining force measurements in vertical wells, deviated wells, and other subterranean environments.

In the specific example illustrated, well system 20 comprises a tool 22, such as a downhole tool, that may be deployed downhole in a wellbore 24 which is formed in a surrounding formation 26. The tool 22 comprises a force sensor 28 located on or within the tool 22 to detect gravitational forces, forces due to acceleration, or other forces at one or more locations along wellbore 24. In some applications, the force sensor 28 may be mounted in cooperation with a gimbaled support structure 30 that enables operation of the sensor 28 to determine force measurements regardless of the orientation of tool 22.

The tool 22 is deployed through wellbore 24 by a suitable conveyance 32. Conveyance 32 may comprise, for example, wireline, tubing (e.g., coiled tubing), drill pipe, logging while drilling systems, or other devices/systems that extend it down into the wellbore. Conveyance 32 also may comprise other types of devices, such as tractors, for moving tool 22 downhole. The tool 22 and force sensor 28 are connected to a processing system 34 having a processor 36 for processing data obtained by tool 22/sensor 28 and for delivering control signals to the tool 22/sensor 28. By way of example, processing system 34 may comprise a computer-based system located at one or more surface locations. Alternatively, some or all of the data processing can be accomplished downhole by locating a suitable processor in tool 22. Various data related to measurements made by sensor 28 and/or control signals provided to tool 22 can be displayed via a graphical user interface 38 or via other suitable media. The communication of data is accomplished through a communication line 40 which may comprise one or more hardwired communication lines, wireless communication lines, fiber-optic lines, combinations of communication lines, and other suitable communication lines.

Figure 2:
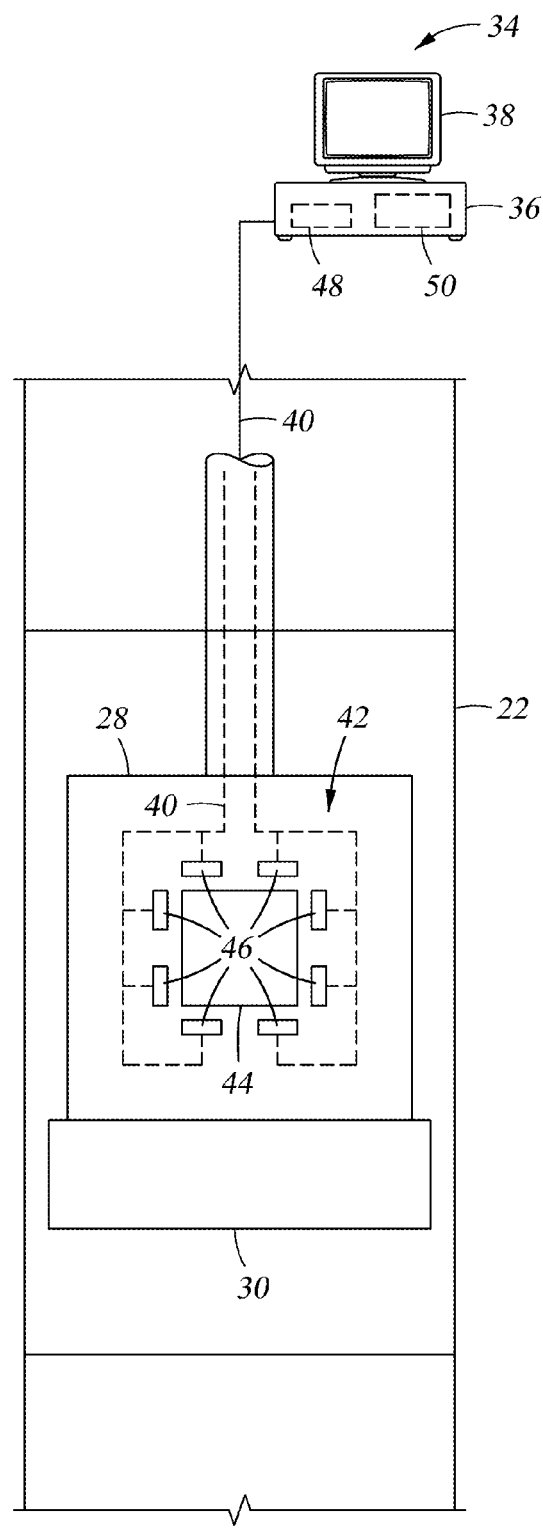
FIG. 2 is a schematic view of apparatus according to one or more aspects of the present disclosure.

Referring generally to FIG. 2, one example of force sensor 28 is illustrated schematically. It should again be noted that tool 22 and force sensor 28 can be deployed not only in subterranean locations, but also in sea or ground surface locations, subsea locations, airborne locations, and space locations for use in a variety of applications. In the present example, force sensor 28 comprises an electrostatic force engine 42 coupled to processing system 34. An individual force sensor is described for clarity, however system 20 also may comprise a pair of force sensors or multiple force sensors that are arranged in an array or other suitable configurations. Electrostatic force engine 42 comprises a movable electrode 44, having a known mass, and a plurality of cooperating electrodes 46. Electrodes 46 may be located at fixed positions around movable electrode 44. In some embodiments, the fixed electrodes 46 are fixed within gimbaled support structure 30 which may be in the form of a gimbaled vessel enclosing fixed electrodes 46 and movable electrode 44.

Upon application of an appropriate signal to fixed electrodes 46, the movable electrode 44 is levitated between the plurality of fixed electrodes. For example, controlled voltages may be applied to the fixed electrodes 46 to create a controlled electrostatic force that levitates the movable electrode 44 between the fixed electrodes. In this embodiment, processing system 34 comprises a signal processor 48 to process inputs from electrodes 46 and other possible inputs from sensor 28. The processing system 34 also may comprise position control electronics 50 to control the signals applied to fixed electrodes 46 and to thus control the position of movable electrode 44. By levitating movable electrode 44 between fixed electrodes 46, sensor 28 is able to accurately detect specific forces acting on tool 22, such as gravitational forces and acceleration forces at desired locations in wellbore 24 or elsewhere.

The electrostatic force engine 42 can be constructed in a variety of sizes and configurations. For example, different numbers of fixed electrode pairs can be used to levitate the movable electrode 44 in one or more desired directions to detect gravity/acceleration forces in one or more corresponding dimensions. In general, when a voltage is applied to a pair of conducting electrodes, e.g., a pair of fixed electrodes 46, an attractive mechanical force is created. The size of the force can be derived from first principles, as set forth below. For example, the potential energy stored in a capacitor can be described as:

$$E = \frac{1}{2}CV^2$$

The energy stored can be considered in terms of the force to move the electrodes from a position $x_1$ to a position $x_2$:

$$E = \int_{x_1}^{x_2} F\,dx$$
$$F = \frac{dE}{dx}$$

For a simple set of parallel electrodes for area A, separation x, and dielectric $\varepsilon$, the capacitance is:

$$C = \frac{\varepsilon A}{x}$$

The energy stored is therefore:

$$E = \frac{1}{2}\frac{\varepsilon A}{x}V^2$$

Therefore the attractive force between the two electrodes is:

$$F = \frac{dE}{dx} = -\frac{\varepsilon A}{2}\left(\frac{V}{x}\right)^2$$

The force comprises at least three important characteristics. First, because the electrodes are conductive, one electrode will fill with a positive charge and the other electrode will fill with a negative charge. The force is therefore always applied in the direction that tends to bring the electrodes closer together. Second, this attractive force is proportional to the square of the applied voltage, and third, the force is inversely proportional to the square of electrode separation.

To move an object and to maintain it in a controlled position in the presence of external forces, such as acceleration forces, a force is required to cause the object to move in a positive sense or a negative sense. Because it is desirable to control the object in both directions, a simple two electrode electrostatic force may provide insufficient control because it only attracts. The use of a movable electrode between fixed electrodes, however, creates a three or more electrode version of the electrostatic force engine. The fixed position electrodes extend within the y-z plane and are spaced along the x axis. When the movable electrode is centered between two fixed electrodes, the displacement x is zero. When the movable electrode is fully displaced in a positive direction, it touches one of the fixed electrodes at a distance x=L. Similarly, when the movable electrode is fully displaced in the negative direction, it touches the other fixed electrode at a distance x=−L. Therefore, the movable electrode has a total displacement range of 2 L. When a voltage $V_0$ is applied to the movable electrode, $V_p$ is applied to the positive displacement electrode, and $V_n$ is applied to the negative displacement electrode, the bipolar force F on the movable electrode is:

$$F_x = \frac{\varepsilon A}{2}\left(\frac{V_p - V_0}{x - L}\right)^2 - \frac{\varepsilon A}{2}\left(\frac{V_n - V_0}{x + L}\right)^2 ; \ -L \le x \le L$$

Assuming voltages $V_p$ and $V_n$ are both greater than or equal to $V_0$, the force, F, tends to cause the movable electrode to move in the positive x direction when $V_p$ is greater than $V_n$, and to cause the movable electrode to move in the negative x direction when $V_p$ is less than $V_n$. If for purposes of illustration we limit the discussion to one axis, the mechanical dynamics of the movable electrode is described by the following equations:

$$F_x(V_{xp}, V_{xn}, V_0, x) = \frac{\varepsilon A_x}{2}\left(\frac{V_{xp} - V_0}{x - L_x}\right)^2 - \frac{\varepsilon A_x}{2}\left(\frac{V_{xn} - V_0}{x + L_x}\right)^2; \ -L \le x \le L$$

$$mg_x + F_{Dx} = m\ddot{x} + \mu_S\dot{x} + \mu_R(\dot{x})^2 + k_x x + F(V_{xp}, V_{xn}, V_0, x)$$

The above terms are, left to right:
 Force of gravity on the movable electrode
 External disturbing force on the movable electrode (system accelerations, etc.)

Force due to acceleration of the movable electrode

Stokes viscous force resisting movement of the movable electrode

Rayleigh viscous force resisting movement of the movable electrode

Spring force on the movable electrode (if a spring is present)

The electrostatic engine force created by controls $V_{xp}$, $V_{xp}$ and $V_0$ at position x Where:

m: mass of the movable electrode $g_x$: acceleration due to gravity in the direction of travel of the movable electrode $F_{Dx}$: disturbing force on the movable electrode $\mu_S$: the Stokes viscous force constant in a viscous gas or liquid $\mu_R$: the Rayleigh viscous force constant in a viscous gas or liquid $k_x$: the spring constant of the movable electrode mount, or spring (if present)

$F(V_{xp}, V_{xn}, V_0, x)$: the electrostatic force caused by controls $V_{xp}$, $V_{xn}$ and $V_0$ at position x.

Control over the movable electrode can be generalized with respect to three dimensions. In this example, the movable electrode is transformed into a three-dimensional cube, or box, or other shapes. The dimensions can be changed to obtain various effects. The movable electrode is one large multi-surfaced electrode set at a potential $V_0$. In this example, six (or more) fixed electrostatic engine electrodes are added in the y-z, x-z, and x-y planes in a manner that allows the movable electrode to make respective excursions, $-L_x < x < +L_x$, $-L_y < y < +L_y$, and $-L_z < z < +L_z$. The fixed electrodes do not have to be planar. In all cases, the extreme limits of x, y and z are assumed to be the point where the movable electrode comes into contact with a fixed electrode. The fixed electrodes are shaped to efficiently apply electrostatic force against the movable electrode. This generalization allows the movable electrode to be centered in 3 dimensions under control of the voltages. The equation of motion for the movable electrode for this configuration is therefore:

$$m\begin{bmatrix} g_z \\ g_y \\ g_x \end{bmatrix} + \begin{bmatrix} F_{Dz} \\ F_{Dy} \\ F_{Dx} \end{bmatrix} =$$

$$m\begin{bmatrix} \ddot{z} \\ \ddot{y} \\ \ddot{x} \end{bmatrix} + \mu_S \begin{bmatrix} \dot{z} \\ \dot{y} \\ \dot{x} \end{bmatrix} + \mu_R \begin{bmatrix} (\dot{z})^2 \\ (\dot{y})^2 \\ (\dot{x})^2 \end{bmatrix} + \begin{bmatrix} k_z z \\ k_y y \\ k_x x \end{bmatrix} + \begin{bmatrix} F_z(V_{zp}, V_{zn}, V_0, z) \\ F_y(V_{yp}, V_{yn}, V_0, y) \\ F_x(V_{xp}, V_{xn}, V_0, x) \end{bmatrix}$$

In other applications, however, angular rotation of the movable electrode about three dimensions, i.e., movement about three rotational axes, also can be considered. The three x, y and z controls are not used to prevent the movable electrode from tilting or rolling with respect to the fixed electrodes. Control over rotational movement can be achieved through a split in all three fixed electrode pairs so that a moment arm can be formed in three axes of rotation. Several approaches can be used to split the three fixed electrode pairs for control over rotation about the three axes. Because the number of electrode pairs equals the number of differential controls, it may be useful in some applications to minimize the number of electrode pairs that require control to simplify the electronics/controls required. According to one embodiment, six electrode pairs are used to control force for the x, y, z position, velocity and acceleration while simultaneously providing control torque for angular position, angular velocity and angular acceleration in the x-y, y-z and z-x planes of rotation. Several electrode pair configurations can be derived that use more than six electrodes. However, a six electrode configuration can be used for purposes of explanation.

Following a "right hand rule", the three electrode pairs are split into six electrode pairs. The y-z plane electrode pair (perpendicular to the x axis) is split into two electrode pairs (four electrodes) along the y=0 line in the z direction lying upon each of the y-z plane electrodes. These four electrodes are driven as two pairs via position control electronics 50 of processing system 34. When these two pairs are driven in "common", they move the movable electrode in the x direction by creating an x axis aligned force. When these two pairs are driven "differentially", the movable electrode is rotated about the z axis because this mode of drive creates a torque about the z axis. A simultaneous "common mode" and "differential mode" drive causes the movable electrode to move in the x direction and rotate about the z axis.

The z-x plane electrode pair (perpendicular to the y axis) is split into two electrode pairs (four electrodes) along the z=0 line in the x direction lying upon each of the z-x plane electrodes. These four electrodes are driven as two pairs. When these two pairs are driven in "common", they move the movable electrode in the y direction by creating a y axis aligned force. When these two pairs are driven "differentially", the movable electrode is rotated about the x axis because this mode of drive creates a torque about the x axis. A simultaneous "common mode" and "differential mode" drive causes the movable electrode to move in the y direction and rotate about the x axis.

The x-y plane electrode pair (perpendicular to the z axis) is split into two electrode pairs (four electrodes) along the x=0 line in the y direction lying upon each of the x-y plane electrodes. These four electrodes are driven as two pairs. When these two pairs are driven in "common", they move the movable electrode in the z direction by creating a z axis aligned force. When these two pairs are driven "differentially", the movable electrode is rotated about the y axis because this mode of drive creates a torque about the y axis. A simultaneous "common mode" and "differential mode" drive causes the movable electrode to move in the z direction and rotate about the y axis. The half splits of the three electrode pairs create six electrode pairs configured for x, y, and z movement and for rotation about the x, y, and z axes.

According to one embodiment, the fixed electrodes 46 surround the movable electrode 44 and constraints on the movable electrode 44 prohibit angular rotation from developing. In this embodiment, the sensor 28 is designed to measure extremely low rates of change with respect to gravity and/or acceleration and not rotation. Therefore, the control of the sensor does not have to be concerned with angular acceleration effects. External angular acceleration can be sensed but the control of angular acceleration of the movable electrode can be highly linearized because the movable electrode can only make small angular position changes with respect to the fixed electrodes. External angular acceleration also accelerates the fixed electrodes (the reference frame for the measurement is always the fixed electrodes), so the movable electrode is forced to follow the fixed electrodes.

When six electrode pairs are employed in a given sensor 28, there are twelve electrodes total and a specific nomenclature can be selected. Using a "right hand rule" x-y-z coordinate system, the following four letter designations can be applied. The first two letters indicate the plane in which the electrode lies. The first letter designates the axis along which the electrode is split (to provide torque force to the movable electrode). The second letter completes the designation for the plane in which the electrode resides. This leads to three combinations:

zy: four electrodes in the y-z plane that are split along the z axis direction, and which exert a perpendicular electrostatic force against the movable electrode that causes the movable electrode to move in the x direction, and apply a torque about the z axis;

xz: four electrodes in the z-x plane that are split along the x axis direction, and which exert a perpendicular electrostatic force against the movable electrode that causes the movable electrode to move in the y direction, and apply a torque about the x axis;

yx: four electrodes in the x-y plane that are split along the y axis direction, and which exert a perpendicular electrostatic force against the movable electrode that causes the movable electrode to move in the z direction, and apply a torque about the y axis.

The last two letter designations are "n" for negative and "p" for positive. The third letter is paired with the second letter and indicates that the electrode is positioned on the positive side of the second letter axis if a "p" or the negative side of the second letter axis if an "n". The third letter also pairs with the first letter axis to indicate clockwise rotational torque about the first letter axis if a "p" and a counterclockwise rotational torque about the first letter axis if an "n". The fourth letter designates the position of the electrode with respect to the axis perpendicular to the plane of the electrode. If the fourth letter is a "p", then the electrode is on the positive side of the axis perpendicular to the plane of the electrode. If the fourth letter is an "n", then the electrode is on the negative side of the axis perpendicular to the plane of the electrode. The fourth letter also indicates force direction along the axis designated by the letter not listed in position one or two. If the fourth letter is a "p" the force is in the positive direction. If the fourth letter is an "n", the force is in the negative direction.

Electrodes with matching first, second and third letter designations are positioned opposite each other, on opposite sides. Electrodes with matching first, second, and fourth letter designations are adjacent to each other on the same side. Torque rotational direction is specified by the third letter designation. Force direction is specified by the fourth letter designation. In this system, the nomenclature can be established as follows:

The movable electrode can be held in position by extending the concept of position measurement to six positions rather than three. Because the electrodes constrain the movable electrode and prevent rotation by mechanical blockage, angular velocity and acceleration can be neglected in favor of six displacement position measurements: $x_n$, $x_p$, $y_n$, $y_p$, $z_n$, $z_p$. When the displacement along an axis is different between the n and p side, the movable electrode is being subjected to a torque. Because there are six electrode pairs, differential application of electrostatic forces can be created to restore all displacements to zero. The electrostatic forces required to maintain the movable electrode in the center (with all displacements equal to zero) provide a direct way of measuring the gravity force on the movable electrode.

The following designations can be used to represent the movable electrode average displacement with respect to a centered location between all electrodes:

$x_p$: average displacement from zypp and zypn electrode pair center $x_n$: average displacement from zynp and zynn electrode pair center $y_p$: average displacement from xzpp and xzpn electrode pair center $y_n$: average displacement from xznp and xznn electrode pair center $z_p$: average displacement from yxpp and yxpn electrode pair center $z_n$: average displacement from yxnp and yxnn electrode pair center Furthermore, the movable electrode can be centered and rotated via the electrostatic forces of the six electrode pairs such that all displacements are driven to zero. Ignoring angular acceleration and angular velocity effects, the previous analysis can be extended to the six measurements and twelve electrostatic force electrodes:

If $V_{abcd}$ is the voltage applied to plate abcd with respect to $V_0$, then:

$$F_{xp}(V_{zypp}, V_{zypn}, V_0, x_p) = \frac{\varepsilon A_{xp}}{2}\left(\frac{V_{zypp} - V_0}{x_p - L_x}\right)^2 - \frac{\varepsilon A_{xp}}{2}\left(\frac{V_{zypn} - V_0}{x_p + L_x}\right)^2;$$

$$-L_x \leq x_p \leq L_x$$

| | | | Electrode Characteristic Designated | | | | |
|---|---|---|---|---|---|---|---|
| Designation | Plane | Split Axis | Torque Axis | Electrode Position | Torque Direction | Force Axis | Force Axis Position | Force Direction |
| zynn | y-z | z | z | Negative y | ccw | x | Negative x | Negative x |
| zynp | y-z | z | z | Negative y | ccw | x | Positive x | Positive x |
| zypn | y-z | z | z | Positive y | cw | x | Negative x | Negative x |
| zypp | y-z | z | z | Positive y | cw | x | Positive x | Positive x |
| xznn | z-x | x | x | Negative z | ccw | y | Negative y | Negative y |
| xznp | z-x | x | x | Negative z | ccw | y | Positive y | Positive y |
| xzpn | z-x | x | x | Positive z | cw | y | Negative y | Negative y |
| xzpp | z-x | x | x | Positive z | cw | y | Positive y | Positive y |
| yxnn | x-y | y | y | Negative x | ccw | z | Negative z | Negative z |
| yxnp | x-y | y | y | Negative x | ccw | z | Positive z | Positive z |
| yxpn | x-y | y | y | Positive x | cw | z | Negative z | Negative z |
| yxpp | x-y | y | y | Positive x | cw | z | Positive z | Positive z |

-continued $$F_{xn}(V_{zynp}, V_{zynn}, V_0, x_n) = \frac{\varepsilon A_{xn}}{2}\left(\frac{V_{zynp} - V_0}{x_n - L_x}\right)^2 - \frac{\varepsilon A_{xn}}{2}\left(\frac{V_{zynn} - V_0}{x_n + L_x}\right)^2;$$

$$-L_x \leq x_n \leq L_x$$

$$F_{yp}(V_{xzpp}, V_{xzpn}, V_0, y_p) = \frac{\varepsilon A_{yp}}{2}\left(\frac{V_{xzpp} - V_0}{y_p - L_y}\right)^2 - \frac{\varepsilon A_{yp}}{2}\left(\frac{V_{xzpn} - V_0}{y_p + L_y}\right)^2;$$

$$-L_y \leq y_p \leq L_y$$

$$F_{yn}(V_{xznp}, V_{xznn}, V_0, y_n) = \frac{\varepsilon A_{yn}}{2}\left(\frac{V_{xznp} - V_0}{y_n - L_y}\right)^2 - \frac{\varepsilon A_{yn}}{2}\left(\frac{V_{xznn} - V_0}{y_n + L_y}\right)^2;$$

$$-L_y \leq y_n \leq L_y$$

$$F_{zp}(V_{yxpp}, V_{yxpn}, V_0, z_p) = \frac{\varepsilon A_{zp}}{2}\left(\frac{V_{yxpp} - V_0}{z_p - L_z}\right)^2 - \frac{\varepsilon A_{zp}}{2}\left(\frac{V_{yxpn} - V_0}{z_p + L_z}\right)^2;$$

$$-L_z \leq z_p \leq L_z$$

$$F_{zn}(V_{yxnp}, V_{yxnn}, V_0, z_n) = \frac{\varepsilon A_{zn}}{2}\left(\frac{V_{yxnp} - V_0}{z_n - L_z}\right)^2 - \frac{\varepsilon A_{zn}}{2}\left(\frac{V_{yxnn} - V_0}{z_n + L_z}\right)^2;$$

$$-L_z \leq z_n \leq L_z$$

The following are defined as:
$L_{zmp}$: the moment arm between the center and the xzpp and xzpn electrode pair center
$L_{zmn}$: the moment arm between the center and the xznp and xznn electrode pair center
$L_{ymp}$: the moment arm between the center and the zypp and zypn electrode pair center
$L_{ymn}$: the moment arm between the center and the zynp and zynn electrode pair center
$L_{xmp}$: the moment arm between the center and the yxpp and yxpn electrode pair center
$L_{xmn}$: the moment arm between the center and the yxnp and yxnn electrode pair center Additionally, the electrode common mode resultant force and difference mode resultant torque can be defined as:

$$F_{ZC} = F_{zp}(V_{yxpp}, V_{yxpn}, V_0, z_p) + F_{zn}(V_{yxnp}, V_{yxnn}, V_0, z_n)$$

$$T_{YD} = F_{zp}(V_{yxpp}, V_{yxpn}, V_0, z_p) \cdot L_{xmp} - F_{zn}(V_{yxnp}, V_{yxnn}, V_0, z_n) \cdot L_{xmn}$$

$$F_{YC} = F_{yp}(V_{xzpp}, V_{xzpn}, V_0, y_p) + F_{yn}(V_{xznp}, V_{xznn}, V_0, y_n)$$

$$T_{XD} = F_{yp}(V_{xzpp}, V_{xzpn}, V_0, y_p) \cdot L_{zmp} - F_{yn}(V_{xznp}, V_{xznn}, V_0, y_n) \cdot L_{zmn}$$

$$F_{XC} = F_{xp}(V_{zypp}, V_{zypn}, V_0, x_p) + F_{xn}(V_{zymp}, V_{zynn}, V_0, x_n)$$

$$T_{ZD} = F_{xp}(V_{zypp}, V_{zypn}, V_0, x_p) \cdot L_{ymp} - F_{xn}(V_{zynp}, V_{zynn}, V_0, x_n) \cdot L_{ymn}$$

Define:

$$\begin{bmatrix} z \\ y \\ x \end{bmatrix} = \frac{1}{2}\begin{bmatrix} z_p + z_n \\ y_p + y_n \\ x_p + x_n \end{bmatrix}$$

Then:

$$m\begin{bmatrix} g_z \\ g_y \\ g_x \end{bmatrix} + \begin{bmatrix} F_{Dz} \\ F_{Dy} \\ F_{Dx} \end{bmatrix} = m\begin{bmatrix} \ddot{z} \\ \ddot{y} \\ \ddot{x} \end{bmatrix} + \mu_S\begin{bmatrix} \dot{z} \\ \dot{y} \\ \dot{x} \end{bmatrix} + \mu_R\begin{bmatrix} (\dot{z})^2 \\ (\dot{y})^2 \\ (\dot{x})^2 \end{bmatrix} + \begin{bmatrix} k_z z \\ k_y y \\ k_x x \end{bmatrix} + \begin{bmatrix} F_{ZC} \\ F_{YC} \\ F_{XC} \end{bmatrix}$$

If, $I_{MZ}$, $I_{MY}$ and $I_{MX}$ are the moments of inertia of the movable electrode and assuming no significant frictional forces exist in twisting, then the torque on the movable electrode is:

$$\begin{bmatrix} T_{Dz} \\ T_{Dy} \\ T_{Dx} \end{bmatrix} = \begin{bmatrix} I_{MZ}\ddot{\theta}_z \\ I_{MY}\ddot{\theta}_y \\ I_{MX}\ddot{\theta}_x \end{bmatrix} + \begin{bmatrix} T_{ZD} \\ T_{YD} \\ T_{XD} \end{bmatrix}$$

In this example, the six electrode pairs 46 provide the ability to translate and/or rotate the movable electrode 44 via electrostatic forces generated by the 12 electrodes 46 (six electrode pairs). If the electrodes are utilized to perform both the electrostatic engine function, and the x, y, z position measurement, the introduction of angular movement, such as tilt and roll, presents the possibility of different x, y and z measurements. According to one embodiment, the movable electrode position can be measured.

In this embodiment, the capacitance between each electrode 46, e.g., electrode abcd, and the movable electrode 44 can be described as follows:

$$C_{zypp} = \frac{\varepsilon A_{xp}}{L_x - x_p}$$

$$C_{zypn} = \frac{\varepsilon A_{xp}}{L_x + x_p}$$

$$C_{zynp} = \frac{\varepsilon A_{xn}}{L_x - x_n}$$

$$C_{zynn} = \frac{\varepsilon A_{xn}}{L_x + x_n}$$

$$C_{xypp} = \frac{\varepsilon A_{yp}}{L_x - y_p}$$

$$C_{xzpn} = \frac{\varepsilon A_{yp}}{L_y + y_p}$$

$$C_{xznp} = \frac{\varepsilon A_{yn}}{L_y - y_n}$$

$$C_{xznn} = \frac{\varepsilon A_{yn}}{L_y + y_n}$$

$$C_{yxpp} = \frac{\varepsilon A_{zp}}{L_z - z_p}$$

$$C_{yxpn} = \frac{\varepsilon A_{zp}}{L_z + z_p}$$

$$C_{yxnp} = \frac{\varepsilon A_{zn}}{L_z - z_n}$$

$$C_{yxnn} = \frac{\varepsilon A_{zn}}{L_z + z_n}$$

In this embodiment, it can be assumed the movable electrode is inductively coupled to a stable voltage level $V_0$, and capacitively coupled to a load resistor. The movable electrode is driven at low frequency to the voltage level $V_0$, and is driven by the mutual capacitance of the fixed electrodes to a high frequency signal $V_s$.

Using the electrode designations previously defined, the fixed electrodes are driven with the following voltages:

$$V_{zypp} = V_{xpp0} + \frac{s_{xp}(t)}{2}$$

-continued $$V_{zypn} = V_{xpn0} - \frac{s_{xp}(t)}{2}$$

$$V_{zynp} = V_{xnp0} + \frac{s_{xn}(t)}{2}$$

$$V_{zynn} = V_{xnn0} - \frac{s_{xn}(t)}{2}$$

$$V_{xzpp} = V_{ypp0} + \frac{s_{yp}(t)}{2}$$

$$V_{vzpn} = V_{ypn0} - \frac{s_{yp}(t)}{2}$$

$$V_{xznp} = V_{ynp0} + \frac{s_{yn}(t)}{2}$$

$$V_{xznn} = V_{ynn0} - \frac{s_{yn}(t)}{2}$$

$$V_{yxpp} = V_{zpp0} + \frac{s_{zp}(t)}{2}$$

$$V_{yxpn} = V_{zpn0} - \frac{s_{zp}(t)}{2}$$

$$V_{yxnp} = V_{znp0} + \frac{s_{zn}(t)}{2}$$

$$V_{yxnn} = V_{znn0} - \frac{s_{zn}(t)}{2}$$

The $s_{\#\#}(t)$ voltages are of high enough frequency to pass through the capacitor to a resistor that is connected to the movable electrode. The $V_{\#\#\#0}$ voltages are of low enough frequency to be blocked by an inductor connected to the movable electrode.

In this embodiment, the $s_{\#\#}(t)$ voltages are defined to be orthogonal to each other, or:

$$0 = \langle s_{xp}(t)s_{xn}(t)\rangle = \langle s_{xp}(t)s_{yp}(t)\rangle = \langle s_{xp}(t)s_{yn}(t)\rangle = \langle s_{xp}(t)s_{zn}(t)\rangle = \langle s_{xp}(t)s_{zp}(t)\rangle$$

$$0 = \langle s_{xn}(t)s_{yp}(t)\rangle = \langle s_{xn}(t)s_{yn}(t)\rangle = \langle s_{xn}(t)s_{zn}(t)\rangle = \langle s_{xn}(t)s_{zp}(t)\rangle$$

$$0 = \langle s_{yp}(t)s_{yn}(t)\rangle = \langle s_{yp}(t)s_{zn}(t)\rangle = \langle s_{yp}(t)s_{zp}(t)\rangle$$

$$0 = \langle s_{yn}(t)s_{zn}(t)\rangle = \langle s_{yn}(t)s_{zp}(t)\rangle = \langle s_{zn}(t)s_{zp}(t)\rangle$$

Inductor and capacitor-resistor pairs are chosen such that the $s_{\#\#}(t)$ signals pass through from the fixed location electrodes 46, to the movable electrode 44, through the coupling capacitor to the resistor so that the signals on the movable electrode can be observed.

Each of the $s_{\#\#}(t)$ signals excites a capacitive voltage divider whose center tap is the movable electrode. Because these signals are orthogonal, each signal can be separately analyzed. The movable electrode voltage transfer function for one of these signals is:

$$\frac{V_{szyp}}{S_{xp}} = \frac{C_{zypp} - C_{zypn}}{C_{zypp} + C_{zypn}} = \frac{\frac{\varepsilon A_{xp}}{L_x - x_p} - \frac{\varepsilon A_{xp}}{L_x + x_p}}{\frac{\varepsilon A_{xp}}{L_x - x_p} + \frac{\varepsilon A_{xp}}{L_x + x_p}} = \frac{x_p}{L_x}$$

The following results are obtained for the other five signals:

$$\frac{V_{szyn}}{S_{xn}} = \frac{C_{zynp} - C_{zynn}}{C_{zynp} + C_{zynn}} = \frac{x_n}{L_x}$$

$$\frac{V_{sxzp}}{S_{yp}} = \frac{C_{xzpp} - C_{xzpn}}{C_{xzpp} + C_{xzpn}} = \frac{y_p}{L_y}$$

$$\frac{V_{sxzn}}{S_{yn}} = \frac{C_{xznp} - C_{xznn}}{C_{xznp} + C_{xznn}} = \frac{y_n}{L_y}$$

$$\frac{V_{syxp}}{S_{zp}} = \frac{C_{yxpp} - C_{yxpn}}{C_{yxpp} + C_{yxpn}} = \frac{z_p}{L_z}$$

$$\frac{V_{syxn}}{S_{zn}} = \frac{C_{yxnp} - C_{yxnn}}{C_{yxnp} + C_{yxnn}} = \frac{z_n}{L_z}$$

The movable electrode voltage for the sum of the $s_{\#\#}(t)$ signals, is therefore:

$$V_s = V_{szyp} + V_{szyn} + V_{sxzp} + V_{sxzn} + V_{syxp} + V_{syxn} =$$

$$V_s = \frac{x_p}{L_x}S_{xp} + \frac{x_n}{L_x}S_{xn} + \frac{y_p}{L_y}S_{yp} + \frac{y_n}{L_y}S_{yn} + \frac{z_p}{L_z}S_{zp} + \frac{z_n}{L_z}S_{zn}$$

$$v_s(t) = \frac{x_p}{L_x}s_{xp}(t) + \frac{x_n}{L_x}s_{xn}(t) + \frac{y_p}{L_y}s_{yp}(t) + \frac{y_n}{L_y}s_{yn}(t) + \frac{z_p}{L_z}s_{zp}(t) + \frac{z_n}{L_z}s_{zn}(t)$$

Because the $s_{\#\#}(t)$ signals are orthogonal to each other, each of the displacements can be measured by correlation in the following manner:

$$\begin{bmatrix} z_p \\ z_n \\ y_p \\ y_n \\ x_p \\ x_n \end{bmatrix} = \left\langle v_s(t) \begin{bmatrix} \frac{L_z}{\langle s_{zp}^2(t)\rangle}s_{zp}(t) \\ \frac{L_z}{\langle s_{zn}^2(t)\rangle}s_{zn}(t) \\ \frac{L_y}{\langle s_{yp}^2(t)\rangle}s_{yp}(t) \\ \frac{L_y}{\langle s_{yn}^2(t)\rangle}s_{yn}(t) \\ \frac{L_x}{\langle s_{xp}^2(t)\rangle}s_{xp}(t) \\ \frac{L_x}{\langle s_{xn}^2(t)\rangle}s_{xn}(t) \end{bmatrix} \right\rangle = \begin{bmatrix} L_z\frac{\langle v_s(t)s_{zp}(t)\rangle}{\langle s_{zp}^2(t)\rangle} \\ L_z\frac{\langle v_s(t)s_{zn}(t)\rangle}{\langle s_{zn}^2(t)\rangle} \\ L_y\frac{\langle v_s(t)s_{yp}(t)\rangle}{\langle s_{yp}^2(t)\rangle} \\ L_y\frac{\langle v_s(t)s_{yn}(t)\rangle}{\langle s_{yn}^2(t)\rangle} \\ L_x\frac{\langle v_s(t)s_{xp}(t)\rangle}{\langle s_{xp}^2(t)\rangle} \\ L_x\frac{\langle v_s(t)s_{xn}(t)\rangle}{\langle s_{xn}^2(t)\rangle} \end{bmatrix} = \begin{bmatrix} L_z\frac{z_p}{L_z} \\ L_z\frac{z_n}{L_z} \\ L_y\frac{y_p}{L_y} \\ L_y\frac{y_n}{L_y} \\ L_x\frac{x_p}{L_x} \\ L_x\frac{x_n}{L_x} \end{bmatrix}$$

The movable electrode position is thereby measured by providing higher frequency signals on each fixed electrode pair, the signals being temporally orthogonal to each respective signal.

In the embodiments described herein, control can be exercised over the position of the movable electrode 44. The movable electrode 44 has a known mass, m, and the gravity, g, or other disturbing forces, including torques, cause movement of the movable electrode. With a sufficient number of fixed electrodes 46, the fixed electrodes provide a set of electrostatic linear forces and torques that act on the movable electrode 44. By measuring the position of the movable electrode via the high-frequency temporally orthogonal voltages applied to fixed electrode pairs, a feedback system, e.g., signal processing system 48 and control electronics 50, of processing system 34 can be used to control the fixed position electrode voltages in a manner that maintains the movable electrode centered between the fixed electrodes. The voltages employed to center the movable electrode 44 are proportional to the electrostatic force required to counterbalance the force of gravity or other external accelerations applied to the movable electrode. Accordingly, the voltage levels are a direct measurement of the gravity and acceleration forces experienced by the movable electrode 44.

In one example, six pairs of spatially orthogonal fixed electrodes are driven in opposing pairs to create displacement forces in three directions and angular displacement forces, i.e., torques, along three dimensions of rotation. The twelve electrode voltages are driven with low-frequency position control voltages and six high frequency, temporally orthogonal position measurement signals via position control electronics 50 and signal processor 48 of processing system 34.

The twelve low frequency motion control voltages can be defined as the sum of a common mode voltage and six respective difference mode voltages as follows:

$$\vec{V}_{motion}(t) = \begin{bmatrix} V_{zpp}(t) \\ V_{zpn}(t) \\ V_{znp}(t) \\ V_{znn}(t) \\ V_{ypp}(t) \\ V_{ypn}(t) \\ V_{ynp}(t) \\ V_{ynn}(t) \\ V_{xpp}(t) \\ V_{xpn}(t) \\ V_{xnp}(t) \\ V_{xnn}(t) \end{bmatrix} = V_{CM} \begin{bmatrix} 1 \\ 1 \\ 1 \\ 1 \\ 1 \\ 1 \\ 1 \\ 1 \\ 1 \\ 1 \\ 1 \\ 1 \end{bmatrix} + \frac{1}{2} \begin{bmatrix} v_{zp}(t) \\ -v_{zp}(t) \\ v_{zn}(t) \\ -v_{zn}(t) \\ v_{yp}(t) \\ -v_{yp}(t) \\ v_{yn}(t) \\ -v_{yn}(t) \\ v_{xp}(t) \\ -v_{xp}(t) \\ v_{xn}(t) \\ -v_{xn}(t) \end{bmatrix} =$$

$$V_{CM} \begin{bmatrix} 1 \\ 1 \\ 1 \\ 1 \\ 1 \\ 1 \\ 1 \\ 1 \\ 1 \\ 1 \\ 1 \\ 1 \end{bmatrix} + \frac{1}{2} \begin{bmatrix} 1 & 0 & 0 & 0 & 0 & 0 \\ -1 & 0 & 0 & 0 & 0 & 0 \\ 0 & 1 & 0 & 0 & 0 & 0 \\ 0 & -1 & 0 & 0 & 0 & 0 \\ 0 & 0 & 1 & 0 & 0 & 0 \\ 0 & 0 & -1 & 0 & 0 & 0 \\ 0 & 0 & 0 & 1 & 0 & 0 \\ 0 & 0 & 0 & -1 & 0 & 0 \\ 0 & 0 & 0 & 0 & 1 & 0 \\ 0 & 0 & 0 & 0 & -1 & 0 \\ 0 & 0 & 0 & 0 & 0 & 1 \\ 0 & 0 & 0 & 0 & 0 & -1 \end{bmatrix} \begin{bmatrix} v_{zp}(t) \\ v_{zn}(t) \\ v_{yp}(t) \\ v_{yn}(t) \\ v_{xp}(t) \\ v_{xn}(t) \end{bmatrix}$$

The twelve motion control voltages are applied to the plates of the fixed electrodes. All of these voltages are greater than or equal to $V_0$ to prevent the electrostatic force from being multi-valued because of the square law nature of the control. The motion control voltages are all set at a common mode voltage of $V_{CM}$ and six respective difference mode voltages. The difference mode voltages control the motion of the movable electrode.

In this embodiment, the position of the movable electrode is measured using six temporally orthogonal measurement signals:

$$\vec{s}(t) = \begin{bmatrix} s_{zp}(t) \\ s_{zn}(t) \\ s_{yp}(t) \\ s_{yn}(t) \\ s_{xp}(t) \\ s_{xn}(t) \end{bmatrix}$$

where, the signals are orthogonal, but not necessarily orthonormal:

$$\left\{ \begin{bmatrix} s_{zp}(t) \\ s_{zn}(t) \\ s_{yp}(t) \\ s_{yn}(t) \\ s_{xp}(t) \\ s_{xn}(t) \end{bmatrix} \begin{bmatrix} \frac{s_{zp}(t)}{\langle s_{zp}^2(t) \rangle} & \frac{s_{zn}(t)}{\langle s_{zn}^2(t) \rangle} & \frac{s_{yp}(t)}{\langle s_{yp}^2(t) \rangle} & \frac{s_{yn}(t)}{\langle s_{yn}^2(t) \rangle} & \frac{s_{xp}(t)}{\langle s_{xp}^2(t) \rangle} & \frac{s_{xn}(t)}{\langle s_{xn}^2(t) \rangle} \end{bmatrix} \right\} =$$

$$\begin{bmatrix} 1 & 0 & 0 & 0 & 0 & 0 \\ 0 & 1 & 0 & 0 & 0 & 0 \\ 0 & 0 & 1 & 0 & 0 & 0 \\ 0 & 0 & 0 & 1 & 0 & 0 \\ 0 & 0 & 0 & 0 & 1 & 0 \\ 0 & 0 & 0 & 0 & 0 & 1 \end{bmatrix}$$

The fixed electrodes also have a set of temporally orthogonal position measurement signals, that are:

$$\vec{V}_{posit}(t) = \frac{1}{2} \begin{bmatrix} 1 & 0 & 0 & 0 & 0 & 0 \\ -1 & 0 & 0 & 0 & 0 & 0 \\ 0 & 1 & 0 & 0 & 0 & 0 \\ 0 & -1 & 0 & 0 & 0 & 0 \\ 0 & 0 & 1 & 0 & 0 & 0 \\ 0 & 0 & -1 & 0 & 0 & 0 \\ 0 & 0 & 0 & 1 & 0 & 0 \\ 0 & 0 & 0 & -1 & 0 & 0 \\ 0 & 0 & 0 & 0 & 1 & 0 \\ 0 & 0 & 0 & 0 & -1 & 0 \\ 0 & 0 & 0 & 0 & 0 & 1 \\ 0 & 0 & 0 & 0 & 0 & -1 \end{bmatrix} \begin{bmatrix} s_{zp}(t) \\ s_{zn}(t) \\ s_{yp}(t) \\ s_{yn}(t) \\ s_{xp}(t) \\ s_{xn}(t) \end{bmatrix}$$

The fixed electrodes are driven with the control voltages and the position measurements signals. Using the electrode designation developed earlier, the resultant electrode voltages are as follows:

$$\vec{V}_{control}(t) = \begin{bmatrix} V_{yxpp}(t) \\ V_{yxpn}(t) \\ V_{yxnp}(t) \\ V_{yxnn}(t) \\ V_{xzpp}(t) \\ V_{xzpn}(t) \\ V_{xznp}(t) \\ V_{xznn}(t) \\ V_{zypp}(t) \\ V_{zypn}(t) \\ V_{zynp}(t) \\ V_{zynn}(t) \end{bmatrix} = \vec{V}_{motion}(t) + \vec{V}_{posit}(t)$$

$$\vec{V}_{control}(t) =$$

$$V_{CM}\begin{bmatrix}1\\1\\1\\1\\1\\1\\1\\1\\1\\1\\1\\1\end{bmatrix} + \frac{1}{2}\begin{bmatrix}1 & 0 & 0 & 0 & 0 & 0\\-1 & 0 & 0 & 0 & 0 & 0\\0 & 1 & 0 & 0 & 0 & 0\\0 & -1 & 0 & 0 & 0 & 0\\0 & 0 & 1 & 0 & 0 & 0\\0 & 0 & -1 & 0 & 0 & 0\\0 & 0 & 0 & 1 & 0 & 0\\0 & 0 & 0 & -1 & 0 & 0\\0 & 0 & 0 & 0 & 1 & 0\\0 & 0 & 0 & 0 & -1 & 0\\0 & 0 & 0 & 0 & 0 & 1\\0 & 0 & 0 & 0 & 0 & -1\end{bmatrix}\begin{bmatrix}v_{zp}(t)+s_{zp}(t)\\v_{zn}(t)+s_{zn}(t)\\v_{yp}(t)+s_{yp}(t)\\v_{yn}(t)+s_{yn}(t)\\v_{xp}(t)+s_{xp}(t)\\v_{xn}(t)+s_{xn}(t)\end{bmatrix}$$

The movable electrode 44 is driven by a direct voltage $V_0$ via a high frequency blocking inductor, and is also driven by the high frequency position measurement signals from the twelve fixed electrodes 46 via the position variable capacitance between the movable electrode 44 and each fixed electrode 46. A high-frequency-passing coupling capacitor electrically connected to the movable electrode allows the summation of the temporally orthogonal position measurement signals to be passed for further amplification and processing. Therefore, the total voltage on the movable electrode is:

$$v_0(t) = V_0 + v_s(t) =$$

$$V_0 + \frac{x_p}{L_x}s_{xp}(t) + \frac{x_n}{L_x}s_{xn}(t) + \frac{y_p}{L_y}s_{yp}(t) + \frac{y_n}{L_y}s_{yn}(t) + \frac{z_p}{L_z}s_{zp}(t) + \frac{z_n}{L_z}s_{zn}(t)$$

By blocking the low frequency component, passing the high frequency component, amplifying, and correlating the signals on the movable electrodes, estimates of the movable electrode position with respect to each fixed electrode is obtained in the following manner:

$$\begin{bmatrix}\hat{z}_p\\\hat{z}_n\\\hat{y}_p\\\hat{y}_n\\\hat{x}_p\\\hat{x}_n\end{bmatrix} =$$

$$\begin{bmatrix}\frac{L_z}{\langle s_{zp}^2(t)\rangle} & 0 & 0 & 0 & 0 & 0\\0 & \frac{L_z}{\langle s_{zn}^2(t)\rangle} & 0 & 0 & 0 & 0\\0 & 0 & \frac{L_y}{\langle s_{yp}^2(t)\rangle} & 0 & 0 & 0\\0 & 0 & 0 & \frac{L_y}{\langle s_{yn}^2(t)\rangle} & 0 & 0\\0 & 0 & 0 & 0 & \frac{L_x}{\langle s_{xp}^2(t)\rangle} & 0\\0 & 0 & 0 & 0 & 0 & \frac{L_x}{\langle s_{xn}^2(t)\rangle}\end{bmatrix}\langle\vec{s}(t)v_0(t)\rangle$$

The estimates for the movable electrode position with respect to the fixed electrodes provide a feedback means of controlling the position of the movable electrode via processing system 34. The electrostatic force of one electrode pair (zypp and zypn: which applies force in the x direction on the p side) can be described as follows:

$$F_{xp}(V_{zypp}, V_{zypn}, V_0, x_p) = \frac{\varepsilon A_{xp}}{2}\left(\frac{V_{zypp}(t)-V_0}{x_p-L_x}\right)^2 - \frac{\varepsilon A_{xp}}{2}\left(\frac{V_{zypn}(t)-V_0}{x_p+L_x}\right)^2$$

Substituting the definition for the control voltage, the force is:

$$F_{xp}(V_{zypp}, V_{zypn}, V_0, x_p) = \frac{\varepsilon A_{xp}}{2}\left(\frac{V_{CM}+\frac{v_{xp}(t)+s_{xp}(t)}{2}-V_0}{L_x-x_p}\right)^2 -$$

$$\frac{\varepsilon A_{xp}}{2}\left(\frac{V_{CM}-\frac{v_{xp}(t)+s_{xp}(t)}{2}-V_0}{L_x+x_p}\right)^2 = F_{xp}(v_{xp}, x_p)$$

$$F_{xp}(v_{xp}, x_p) = \frac{\varepsilon A_{xp}}{2}\left(\frac{2(L_x^2+x_p^2)(v_{xp}(t)+s_{xp}(t))(V_{CM}-V_0)+}{4x_pL_x((V_{CM}-V_0)^2-(v_{xp}(t)+s_{xp}(t))^2)}\right)$$

$$F_{xp}(v_{xp}, x_p) = \frac{\varepsilon A_{xp}}{L_x^2\left(1-\frac{x_p^2}{L_x^2}\right)^2}\left(\left(1+\frac{x_p^2}{L_x^2}\right)(v_{xp}(t)+s_{xp}(t))(V_{CM}-V_0)+\right.$$

$$\left.2\frac{x_p}{L_x}((V_{CM}-V_0)^2-(v_{xp}(t)+s_{xp}(t))^2)\right)$$

Likewise, substituting the motion control voltage and position measurement voltage into equations for the electrostatic forces produced by the other electrodes, the following is obtained:

$$F_{xn}(v_{xn}, x_n) = \frac{\varepsilon A_{xn}}{L_x^2\left(1-\frac{x_n^2}{L_x^2}\right)^2}\left(\left(1+\frac{x_n^2}{L_x^2}\right)(v_{xn}(t)+s_{xn}(t))(V_{CM}-V_0)+\right.$$

$$\left.2\frac{x_n}{L_x}((V_{CM}-V_0)^2-(v_{xn}(t)+s_{xn}(t))^2)\right)$$

-continued $$F_{yp}(v_{yp}, y_p) = \frac{\varepsilon A_{yp}}{L_y^2\left(1-\frac{y_p^2}{L_y^2}\right)^2}\left(\left(1+\frac{y_p^2}{L_y^2}\right)(v_{yp}(t)+s_{yp}(t))(V_{CM}-V_0)+\right.$$

$$\left. 2\frac{y_p}{L_y}((V_{CM}-V_0)^2-(v_{yp}(t)+s_{yp}(t))^2)\right)$$

$$F_{yn}(v_{yn}, y_n) = \frac{\varepsilon A_{yn}}{L_y^2\left(1-\frac{y_n^2}{L_y^2}\right)^2}\left(\left(1+\frac{y_n^2}{L_y^2}\right)(v_{yn}(t)+s_{yn}(t))(V_{CM}-V_0)+\right.$$

$$\left. 2\frac{y_n}{L_y}((V_{CM}-V_0)^2-(v_{yn}(t)+s_{yn}(t))^2)\right)$$

$$F_{zp}(v_{zp}, z_p) = \frac{\varepsilon A_{zp}}{L_z^2\left(1-\frac{z_p^2}{L_z^2}\right)^2}\left(\left(1+\frac{z_p^2}{L_z^2}\right)(v_{zp}(t)+s_{zp}(t))(V_{CM}-V_0)+\right.$$

$$\left. 2\frac{z_p}{L_z}((V_{CM}-V_0)^2-(v_{zp}(t)+s_{zp}(t))^2)\right)$$

$$F_{zn}(v_{zn}, z_n) = \frac{\varepsilon A_{zn}}{L_z^2\left(1-\frac{z_n^2}{L_z^2}\right)^2}\left(\left(1+\frac{z_n^2}{L_z^2}\right)(v_{zn}(t)+s_{zn}(t))(V_{CM}-V_0)+\right.$$

$$\left. 2\frac{z_n}{L_z}((V_{CM}-V_0)^2-(v_{zn}(t)+s_{zn}(t))^2)\right)$$

If the position measurement signals are small in magnitude compared to the magnitude of the motion control voltages, and the displacements are controlled so as to be very close to zero, the electrostatic forces are approximately:

$$F_{xp}(v_{xp}, x_p) \approx \frac{\varepsilon A_{xp}\left(1+\frac{x_p^2}{L_x^2}\right)}{L_x^2\left(1-\frac{x_p^2}{L_x^2}\right)^2}(V_{CM}-V_0)v_{xp}(t)$$

$$\approx \frac{\varepsilon A_{xp}}{L_x^2}(V_{CM}-V_0)v_{xp}(t)$$

$$F_{xn}(v_{xn}, x_n) \approx \frac{\varepsilon A_{xn}}{L_x^2}(V_{CM}-V_0)v_{xn}(t)$$

$$F_{yp}(v_{yp}, y_p) \approx \frac{\varepsilon A_{yp}}{L_y^2}(V_{CM}-V_0)v_{yp}(t)$$

$$F_{yn}(v_{yn}, y_n) = \frac{\varepsilon A_{yn}}{L_y^2}(V_{CM}-V_0)v_{yn}(t)$$

$$F_{zp}(v_{zp}, z_p) = \frac{\varepsilon A_{zp}}{L_z^2}(V_{CM}-V_0)v_{zp}(t)$$

$$F_{zn}(v_{zn}, z_n) = \frac{\varepsilon A_{zn}}{L_z^2}(V_{CM}-V_0)v_{zn}(t)$$

Rather than attempt the minimization of the x, y, z displacement and the angular displacements of the movable electrode, the forces and torques can be counter-balanced by simply providing control which induces electrostatic forces that position the movable electrode such that the displacements $x_p$, $x_n$, $y_p$, $y_n$, $z_p$, and $z_n$ are all zero. Assuming that angular displacements are small, and angular momentum is negligible in this modified coordinate system, Rayleigh viscous forces are negligible, and there are no springs attached to the movable electrode, the equations of motion ($F_T$ being an equivalent gravity force and disturbing force) are:

$$\vec{F}_T(t) = \begin{bmatrix} F_{Tzp}(t) \\ F_{Tzn}(t) \\ F_{Typ}(t) \\ F_{Tyn}(t) \\ F_{Txp}(t) \\ F_{Txn}(t) \end{bmatrix} = m\begin{bmatrix} \ddot{z}_p \\ \ddot{z}_n \\ \ddot{y}_p \\ \ddot{y}_n \\ \ddot{x}_p \\ \ddot{x}_n \end{bmatrix} + \mu_S\begin{bmatrix} \dot{z}_p \\ \dot{z}_n \\ \dot{y}_p \\ \dot{y}_n \\ \dot{x}_p \\ \dot{x}_n \end{bmatrix} + \begin{bmatrix} F_{zp}(v_{zp}, z_p) \\ F_{zn}(v_{zn}, z_n) \\ F_{yp}(v_{yp}, y_p) \\ F_{yn}(v_{yn}, y_n) \\ F_{xp}(v_{xp}, x_p) \\ F_{xn}(v_{xn}, x_n) \end{bmatrix}$$

Using Laplace transforms and utilizing the approximate (linearized) values for the electrostatic forces, the modified coordinate system is:

$$\vec{F}_T(s) = \begin{bmatrix} F_{Tzp}(s) \\ F_{Tzn}(s) \\ F_{Typ}(s) \\ F_{Tyn}(s) \\ F_{Txp}(s) \\ F_{Txn}(s) \end{bmatrix} = (s^2 m + s\mu_S)\begin{bmatrix} z_p \\ z_n \\ y_p \\ y_n \\ x_p \\ x_n \end{bmatrix} + \begin{bmatrix} \frac{\varepsilon A_{zp}}{L_z^2}(V_{CM}-V_0)V_{zp}(s) \\ \frac{\varepsilon A_{zn}}{L_z^2}(V_{CM}-V_0)V_{zn}(s) \\ \frac{\varepsilon A_{yp}}{L_y^2}(V_{CM}-V_0)V_{yp}(s) \\ \frac{\varepsilon A_{yn}}{L_y^2}(V_{CM}-V_0)V_{yn}(s) \\ \frac{\varepsilon A_{xp}}{L_x^2}(V_{CM}-V_0)V_{xp}(s) \\ \frac{\varepsilon A_{xn}}{L_x^2}(V_{CM}-V_0)V_{xp}(s) \end{bmatrix}$$

Processing system 34 may comprise a proportional-integral-differential (PID) control system. According to one embodiment, the equation of motion suggests a proportional-integral-differential control system of the following form:

$$\begin{bmatrix} V_{zp}(s) \\ V_{zn}(s) \\ V_{yp}(s) \\ V_{yn}(s) \\ V_{xp}(s) \\ V_{xn}(s) \end{bmatrix} = \begin{bmatrix} \left(a_{zp2}s + a_{zp1} + \frac{a_{zp0}}{s}\right)z_p \\ \left(a_{zn2}s + a_{zn1} + \frac{a_{zn0}}{s}\right)z_n \\ \left(a_{yp2}s + a_{yp1} + \frac{a_{yp0}}{s}\right)y_p \\ \left(a_{yn2}s + a_{yn1} + \frac{a_{yn0}}{s}\right)y_n \\ \left(a_{xp2}s + a_{xp1} + \frac{a_{xp0}}{s}\right)x_p \\ \left(a_{xn2}s + a_{xn1} + \frac{a_{xn0}}{s}\right)z_n \end{bmatrix} \approx \begin{bmatrix} \frac{F_{Tzp}(s)}{\frac{\varepsilon A_{zp}}{L_z^2}(V_{CM}-V_0)} \\ \frac{F_{Tzn}(s)}{\frac{\varepsilon A_{zn}}{L_z^2}(V_{CM}-V_0)} \\ \frac{F_{Typ}(s)}{\frac{\varepsilon A_{yp}}{L_y^2}(V_{CM}-V_0)} \\ \frac{F_{Tyn}(s)}{\frac{\varepsilon A_{yn}}{L_y^2}(V_{CM}-V_0)} \\ \frac{F_{Txp}(s)}{\frac{\varepsilon A_{xp}}{L_x^2}(V_{CM}-V_0)} \\ \frac{F_{Txn}(s)}{\frac{\varepsilon A_{xn}}{L_x^2}(V_{CM}-V_0)} \end{bmatrix} -$$

-continued $$\begin{bmatrix} \frac{(s^2m+s\mu_S)z_p}{\frac{\varepsilon A_{zp}}{L_z^2}(V_{CM}-V_0)} \\ \frac{(s^2m+s\mu_S)z_n}{\frac{\varepsilon A_{zn}}{L_z^2}(V_{CM}-V_0)} \\ \frac{(s^2m+s\mu_S)y_p}{\frac{\varepsilon A_{yp}}{L_y^2}(V_{CM}-V_0)} \\ \frac{(s^2m+s\mu_S)y_n}{\frac{\varepsilon A_{yn}}{L_y^2}(V_{CM}-V_0)} \\ \frac{(s^2m+s\mu_S)x_p}{\frac{\varepsilon A_{xp}}{L_x^2}(V_{CM}-V_0)} \\ \frac{(s^2m+s\mu_S)x_n}{\frac{\varepsilon A_{xn}}{L_x^2}(V_{CM}-V_0)} \end{bmatrix}$$

With the motion control voltages defined in this manner, the movable electrode displacements behave in the following manner under feedback control:

$$\begin{bmatrix} z_p \\ z_n \\ y_p \\ y_n \\ x_p \\ x_n \end{bmatrix} \approx \begin{bmatrix} \frac{s}{ms^3+\left(\mu_S+a_{zp2}\frac{\varepsilon A_{zp}}{L_z^2}(V_{CM}-V_0)\right)s^2+a_{zp1}\frac{\varepsilon A_{zp}}{L_z^2}(V_{CM}-V_0)s+a_{zp0}\frac{\varepsilon A_{zp}}{L_z^2}(V_{CM}-V_0)}F_{Tzp}(s) \\ \frac{s}{ms^3+\left(\mu_S+a_{zn2}\frac{\varepsilon A_{zn}}{L_z^2}(V_{CM}-V_0)\right)s^2+a_{zn1}\frac{\varepsilon A_{zn}}{L_z^2}(V_{CM}-V_0)s+a_{zn0}\frac{\varepsilon A_{zn}}{L_z^2}(V_{CM}-V_0)}F_{Tzn}(s) \\ \frac{s}{ms^3+\left(\mu_S+a_{yp2}\frac{\varepsilon A_{yp}}{L_y^2}(V_{CM}-V_0)\right)s^2+a_{yp1}\frac{\varepsilon A_{yp}}{L_y^2}(V_{CM}-V_0)s+a_{yp0}\frac{\varepsilon A_{yp}}{L_y^2}(V_{CM}-V_0)}F_{Typ}(s) \\ \frac{s}{ms^3+\left(\mu_S+a_{yn2}\frac{\varepsilon A_{yn}}{L_y^2}(V_{CM}-V_0)\right)s^2+a_{yn1}\frac{\varepsilon A_{yn}}{L_y^2}(V_{CM}-V_0)s+a_{yn0}\frac{\varepsilon A_{yn}}{L_y^2}(V_{CM}-V_0)}F_{Tyn}(s) \\ \frac{s}{ms^3+\left(\mu_S+a_{xp2}\frac{\varepsilon A_{xp}}{L_x^2}(V_{CM}-V_0)\right)s^2+a_{xp1}\frac{\varepsilon A_{xp}}{L_x^2}(V_{CM}-V_0)s+a_{xp0}\frac{\varepsilon A_{xp}}{L_x^2}(V_{CM}-V_0)}F_{Txp}(s) \\ \frac{s}{ms^3+\left(\mu_S+a_{xn2}\frac{\varepsilon A_{xn}}{L_x^2}(V_{CM}-V_0)\right)s^2+a_{xn1}\frac{\varepsilon A_{xn}}{L_x^2}(V_{CM}-V_0)s+a_{xn0}\frac{\varepsilon A_{xn}}{L_x^2}(V_{CM}-V_0)}F_{Txn}(s) \end{bmatrix}$$

The feedback control is stable when the Laplace transform polynomial roots of the displacement transfer functions are in the left half s-plane. In this embodiment, the control is essentially a feedback control based upon the measured movable electrode position vector. The movable electrode displacement vector is measured, and then the motion control fixed electrode voltages are defined by the measured displacement vector:

$$\begin{bmatrix} V_{zp}(s) \\ V_{zn}(s) \\ V_{yp}(s) \\ V_{yn}(s) \\ V_{xp}(s) \\ V_{xn}(s) \end{bmatrix} = \begin{bmatrix} \left(a_{zp2}s+a_{zp1}+\frac{a_{zp0}}{s}\right)\hat{z}_p \\ \left(a_{zn2}s+a_{zn1}+\frac{a_{zn0}}{s}\right)\hat{z}_n \\ \left(a_{yp2}s+a_{yp1}+\frac{a_{yp0}}{s}\right)\hat{y}_p \\ \left(a_{yn2}s+a_{yn1}+\frac{a_{yn0}}{s}\right)\hat{y}_n \\ \left(a_{xp2}s+a_{xp1}+\frac{a_{xp0}}{s}\right)\hat{x}_p \\ \left(a_{xn2}s+a_{xn1}+\frac{a_{xn0}}{s}\right)\hat{x}_n \end{bmatrix}$$

The PID control gains, the a's, can be determined experimentally for a particular gravity sensor configuration. The development shown here is based upon a linearization of the square law in voltage electrostatic forces. The non-linearity of the control may require analysis to determine the range of "a" values in the PID control that lead to stable control. The PID gains also are a function of the mass of the movable electrode, and the viscous damping it experiences. The shape of the movable electrode can make the effective mass and viscous damping different for each coordinate. These factors can influence the range and choice of the PID control gains.

Accordingly, the electrostatic force engine 42 can be used to measure forces, e.g., gravity and acceleration, in downhole environments and a variety of other environments. Neglecting Rayleigh viscous forces and assuming there are no springs, the equations of motion for the movable electrode under the control of six pairs of fixed electrodes (as previously described) are:

$$m\begin{bmatrix} g_z \\ g_y \\ g_x \end{bmatrix} + \begin{bmatrix} F_{Dz} \\ F_{Dy} \\ F_{Dx} \end{bmatrix} =$$

$$\frac{m}{2}\begin{bmatrix} \ddot{z}_p+\ddot{z}_n \\ \ddot{y}_p+\ddot{y}_n \\ \ddot{x}_p+\ddot{x}_n \end{bmatrix} + \frac{\mu_S}{2}\begin{bmatrix} \dot{z}_p+\dot{z}_n \\ \dot{y}_p+\dot{y}_n \\ \dot{x}_p+\dot{x}_n \end{bmatrix} + \begin{bmatrix} F_{zp}(v_{zp},z_p)+F_{zn}(v_{zn},z_n) \\ F_{yp}(v_{yp},y_p)+F_{yn}(v_{yn},y_n) \\ F_{xp}(v_{xp},x_p)+F_{xn}(v_{xn},x_n) \end{bmatrix}$$

If the means of both sides of the equations are taken; the disturbing forces are assumed to be zero mean; and the feedback control is assumed to cause the displacements to be zero mean acceleration and velocity, then:

$$m\begin{bmatrix} \langle g_z \rangle \\ \langle g_y \rangle \\ \langle g_x \rangle \end{bmatrix} + \begin{bmatrix} \langle F_{Dz} \rangle \\ \langle F_{Dy} \rangle \\ \langle F_{Dx} \rangle \end{bmatrix} =$$

$$\frac{m}{2}\begin{bmatrix} \langle \ddot{z}_p+\ddot{z}_n \rangle \\ \langle \ddot{y}_p+\ddot{y}_n \rangle \\ \langle \ddot{x}_p+\ddot{x}_n \rangle \end{bmatrix} + \frac{\mu_S}{2}\begin{bmatrix} \langle \dot{z}_p+\dot{z}_n \rangle \\ \langle \dot{y}_p+\dot{y}_n \rangle \\ \langle \dot{x}_p+\dot{x}_n \rangle \end{bmatrix} + \begin{bmatrix} \langle F_{zp}(v_{zp},z_p)+F_{zn}(v_{zn},z_n) \rangle \\ \langle F_{yp}(v_{yp},y_p)+F_{yn}(v_{yn},y_n) \rangle \\ \langle F_{xp}(v_{xp},x_p)+F_{xn}(v_{xn},x_n) \rangle \end{bmatrix}$$

$$m\begin{bmatrix} \langle g_z \rangle \\ \langle g_y \rangle \\ \langle g_x \rangle \end{bmatrix} = \begin{bmatrix} \langle F_{zp}(v_{zp},z_p)+F_{zn}(v_{zn},z_n) \rangle \\ \langle F_{yp}(v_{yp},y_p)+F_{yn}(v_{yn},y_n) \rangle \\ \langle F_{xp}(v_{xp},x_p)+F_{xn}(v_{xn},x_n) \rangle \end{bmatrix} =$$

$$\begin{bmatrix} \langle F_{zp}(v_{zp}, z_p) \rangle \\ \langle F_{yp}(v_{yp}, y_p) \rangle \\ \langle F_{xp}(v_{xp}, x_p) \rangle \end{bmatrix} + \begin{bmatrix} \langle F_{zn}(v_{zn}, z_n) \rangle \\ \langle F_{yn}(v_{yn}, y_n) \rangle \\ \langle F_{xn}(v_{xn}, x_n) \rangle \end{bmatrix}$$

The means of the electrostatic forces can be estimated via the means of several parameters that are inherent in the gravity sensor design (fixed electrode area dimensions, fixed electrode gap lengths, permittivity, fixed voltages $V_{CM}$ and $V_0$), and parameters which are measured (the displacements and the motion control voltages). The feedback control minimizes the mean of the displacements. However, the mean square value of the displacements can be significant. Grouping these parameters, the means are:

$$\langle F_{zp}(v_{zp}, z_p) \rangle = \frac{\varepsilon A_{zp}(V_{CM} - V_0)}{L_z^2} \left\{ \frac{\left(1 + \frac{\hat{z}_p^2}{L_z^2}\right)}{\left(1 - \frac{\hat{z}_p^2}{L_z^2}\right)^2} \right\} \langle v_{zp}(t) \rangle$$

$$\langle F_{zn}(v_{zn}, z_n) \rangle = \frac{\varepsilon A_{zn}(V_{CM} - V_0)}{L_z^2} \left\{ \frac{\left(1 + \frac{\hat{z}_n^2}{L_z^2}\right)}{\left(1 - \frac{\hat{z}_n^2}{L_z^2}\right)^2} \right\} \langle v_{zn}(t) \rangle$$

-continued $$\langle F_{yp}(v_{yp}, y_p) \rangle = \frac{\varepsilon A_{yp}(V_{CM} - V_0)}{L_y^2} \left\{ \frac{\left(1 + \frac{\hat{y}_p^2}{L_y^2}\right)}{\left(1 - \frac{\hat{y}_p^2}{L_y^2}\right)^2} \right\} \langle v_{yp}(t) \rangle$$

$$\langle F_{yn}(v_{yn}, y_p) \rangle = \frac{\varepsilon A_{yn}(V_{CM} - V_0)}{L_y^2} \left\{ \frac{\left(1 + \frac{\hat{y}_n^2}{L_y^2}\right)}{\left(1 - \frac{\hat{y}_n^2}{L_y^2}\right)^2} \right\} \langle v_{yn}(t) \rangle$$

$$\langle F_{xp}(v_{xp}, x_p) \rangle = \frac{\varepsilon A_{xp}(V_{CM} - V_0)}{L_x^2} \left\{ \frac{\left(1 + \frac{\hat{x}_p^2}{L_x^2}\right)}{\left(1 - \frac{\hat{x}_p^2}{L_x^2}\right)^2} \right\} \langle v_{xp}(t) \rangle$$

$$\langle F_{xn}(v_{xn}, x_n) \rangle = \frac{\varepsilon A_{xn}(V_{CM} - V_0)}{L_x^2} \left\{ \frac{\left(1 + \frac{\hat{x}_n^2}{L_x^2}\right)}{\left(1 - \frac{\hat{x}_n^2}{L_x^2}\right)^2} \right\} \langle v_{xn}(t) \rangle$$

A first order estimate of the acceleration due to gravity is based upon sensor parameters and the motion control voltages applied to the fixed electrodes:

$$\begin{bmatrix} \hat{g}_z \\ \hat{g}_y \\ \hat{g}_x \end{bmatrix} = \begin{bmatrix} \frac{\varepsilon A_{zp}(V_{CM} - V_0)}{mL_z^2} \langle v_{zp}(t) \rangle + \frac{\varepsilon A_{zn}(V_{CM} - V_0)}{mL_z^2} \langle v_{zn}(t) \rangle \\ \frac{\varepsilon A_{yp}(V_{CM} - V_0)}{mL_y^2} \langle v_{yp}(t) \rangle + \frac{\varepsilon A_{yn}(V_{CM} - V_0)}{mL_y^2} \langle v_{yn}(t) \rangle \\ \frac{\varepsilon A_{xp}(V_{CM} - V_0)}{mL_x^2} \langle v_{xp}(t) \rangle + \frac{\varepsilon A_{xn}(V_{CM} - V_0)}{mL_x^2} \langle v_{xn}(t) \rangle \end{bmatrix}$$

A second order estimate of the acceleration due to gravity is based upon sensor parameters, the motion control voltages applied to the fixed electrodes and the estimates for the displacements. This gravity estimate involves the calculation of the mean of a nonlinear function of the displacements as follows:

$$\begin{bmatrix} \hat{g}_z \\ \hat{g}_y \\ \hat{g}_x \end{bmatrix} = \begin{bmatrix} \frac{\varepsilon A_{zp}(V_{CM} - V_0)}{mL_z^2} \left\{ \frac{\left(1 + \frac{\hat{z}_p^2}{L_z^2}\right)}{\left(1 - \frac{\hat{z}_p^2}{L_z^2}\right)^2} \right\} \langle v_{zp}(t) \rangle + \frac{\varepsilon A_{zn}(V_{CM} - V_0)}{mL_z^2} \left\{ \frac{\left(1 + \frac{\hat{z}_n^2}{L_z^2}\right)}{\left(1 - \frac{\hat{z}_n^2}{L_z^2}\right)^2} \right\} \langle v_{zn}(t) \rangle \\ \frac{\varepsilon A_{yp}(V_{CM} - V_0)}{mL_y^2} \left\{ \frac{\left(1 + \frac{\hat{y}_p^2}{L_y^2}\right)}{\left(1 - \frac{\hat{y}_p^2}{L_y^2}\right)^2} \right\} \langle v_{yp}(t) \rangle + \frac{\varepsilon A_{yn}(V_{CM} - V_0)}{mL_y^2} \left\{ \frac{\left(1 + \frac{\hat{y}_n^2}{L_y^2}\right)}{\left(1 - \frac{\hat{y}_n^2}{L_y^2}\right)^2} \right\} \langle v_{yn}(t) \rangle \\ \frac{\varepsilon A_{xp}(V_{CM} - V_0)}{mL_x^2} \left\{ \frac{\left(1 + \frac{\hat{x}_p^2}{L_x^2}\right)}{\left(1 - \frac{\hat{x}_p^2}{L_x^2}\right)^2} \right\} \langle v_{xp}(t) \rangle + \frac{\varepsilon A_{xn}(V_{CM} - V_0)}{mL_x^2} \left\{ \frac{\left(1 + \frac{\hat{x}_n^2}{L_x^2}\right)}{\left(1 - \frac{\hat{x}_n^2}{L_x^2}\right)^2} \right\} \langle v_{xn}(t) \rangle \end{bmatrix}$$

Although many types of control systems can be used in cooperation with the electrostatic force engine 42, the signal processor 48 is used in this embodiment to process signals received from fixed electrodes 46 and/or movable electrode 44. Additionally, the position control electronics 50 utilizes the data obtained by signal processor 48 to control the position of movable electrode 44 within electrodes 46, as described above. In some embodiments, the sensor 28 comprises or is mounted to gimbaled support structure 30 which may be in the form of a protective, gimbaled vessel. The movable electrode 44 has a fixed mass and may be designed to freely float between the fixed electrodes 46.

In many embodiments, electrodes 46 are fixed electrodes structured to be driven in opposing pairs around a movable mass, as in the embodiments described above. Depending on the specific application, the fixed electrode pairs can be positioned and configured in a variety of ways. For example, if the gravity, acceleration or other forces are to be measured in a limited number of dimensions, e.g., one, two or three dimensions, the corresponding number of electrode pairs can be employed in sensor 28 as needed to levitate the movable electrode in the desired dimensions. As described above, however, six (or more) electrode pairs can be arranged in a configuration that provides electrostatic forces able to move the movable electrode 44 in the positive and negative x, y and z directions as well as in the clockwise and counterclockwise directions about the x, y and z axes.

Figure 3:
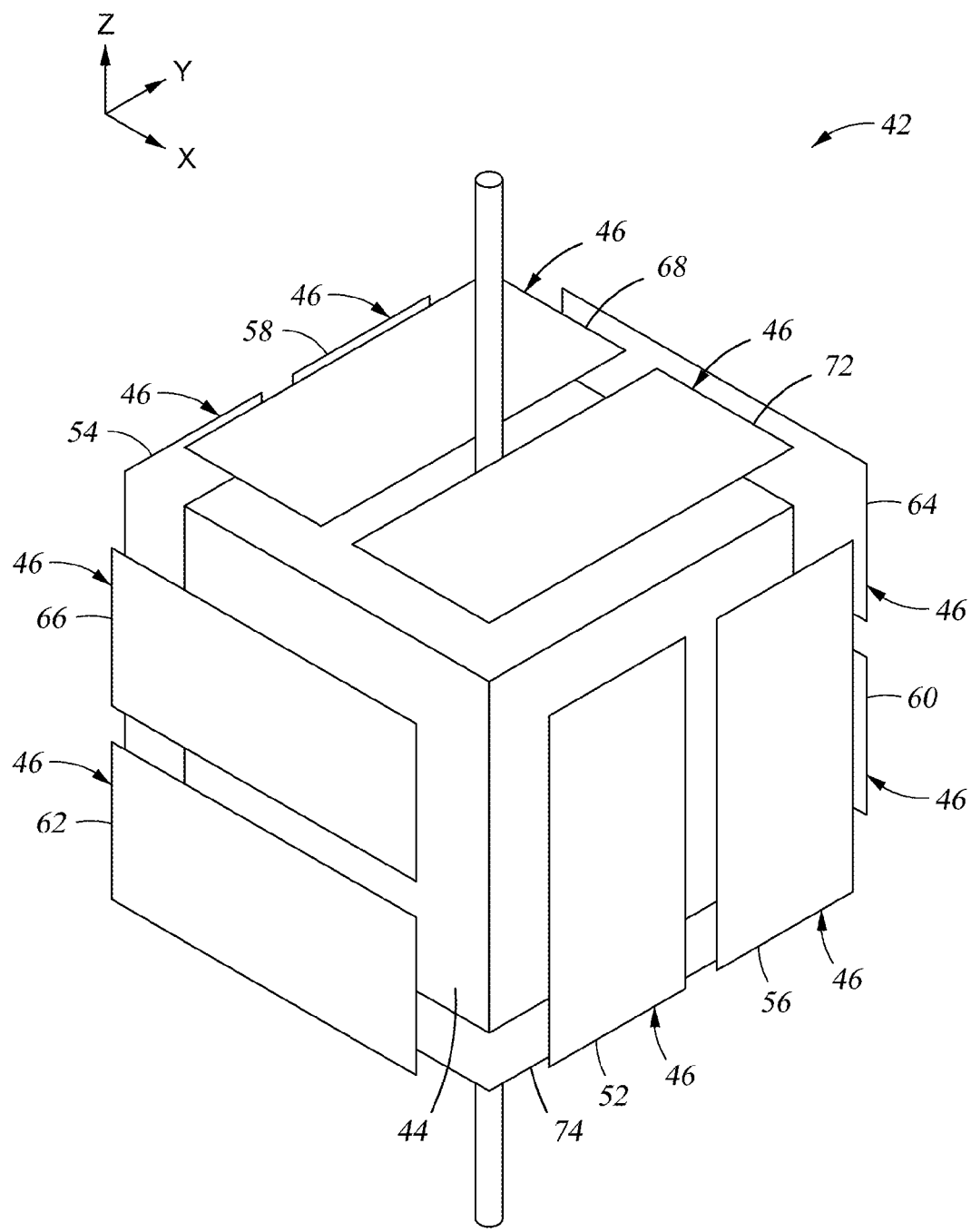
FIG. 3 is a schematic view of apparatus according to one or more aspects of the present disclosure.
Figure 4:
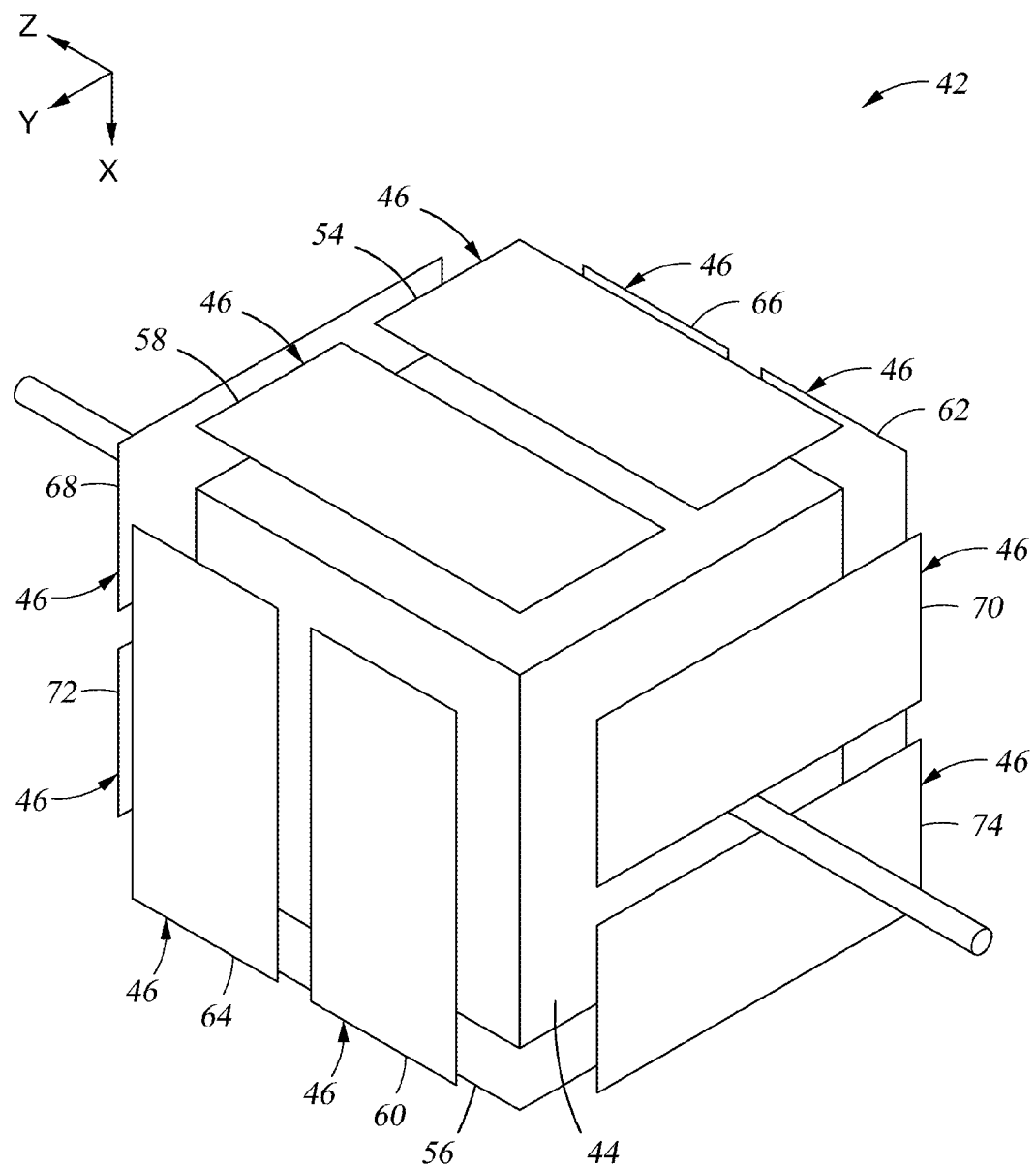
FIG. 4 is a schematic view of apparatus according to one or more aspects of the present disclosure.

Referring generally to FIGS. 3 and 4, one embodiment of the electrostatic force engine 42 is illustrated. However, it should be recognized that the embodiment is provided to facilitate explanation and that the electrostatic force engine 42 can be constructed in other configurations with other numbers of fixed electrodes 46. As illustrated, electrodes 46 are fixed electrodes mounted around movable electrode 44, and individual electrodes 46 have been given unique reference numbers to facilitate explanation of the operation of electrostatic force engine 42.

In this particular example, a fixed electrode 52 corresponds to the fixed electrode designated zynp in the description provided above. Fixed electrode 52 is paired with a corresponding fixed electrode 54 designated zynn according to the nomenclature described above. This pair of electrodes is positioned on opposing sides of the movable electrode 44 to provide motion of the movable electrode in the positive x direction when voltage on fixed electrode 52 exceeds the voltage on fixed electrode 54. Electrodes 52, 54 also provide counterclockwise rotation about the z axis under the same electrode stimulus. When the electrode stimulus voltage is reversed in polarity, the fixed electrode pair 52, 54 moves electrode 44 in the negative x direction and also torques the movable electrode 44 in a clockwise direction about the z axis. In this embodiment, the position control electronics 50 of processing system 34 drives fixed electrode 52 with voltage $V_{zynp}$ and drives fixed electrode 54 with voltage $V_{zynn}$. The function of voltages $V_{zynp}$ and $V_{zynn}$ is discussed in greater detail above.

Similarly, fixed electrode 56, designated zypp, and fixed electrode 58, designated zypn, are mounted in opposition about the free floating movable electrode 44. The fixed electrode pair 56, 58 provides movement of the movable electrode 44 in the positive x direction when the voltage on fixed electrode 56 exceeds the voltage on fixed electrode 58. With the same polarity of excitation the fixed electrode pair 56, 58 rotates the movable electrode 44 in the clockwise direction about the z axis. When the voltage on fixed electrode 56 is less than the voltage on fixed electrode 58, the movable electrode 44 moves in the negative x direction and rotates counterclockwise about the z axis. Again, position control electronics 50 can be used to drive fixed electrode 56 with voltage $V_{zypp}$ and fixed electrode 58 with voltage $V_{zypn}$. The function of voltages $V_{zypp}$ and $V_{zypn}$ is discussed in greater detail above.

Similarly, fixed electrode 60, designated xznp, and fixed electrode 62, designated xznn, are mounted in opposition about the free floating movable electrode 44. The fixed electrode pair 60, 62 provides movement of the movable electrode 44 in the positive y direction when the voltage on fixed electrode 60 exceeds the voltage on fixed electrode 62. With the same polarity of excitation the fixed electrode pair 60, 62 rotates the movable electrode 44 in the counterclockwise direction about the x axis. When the voltage on fixed electrode 60 is less than the voltage on fixed electrode 62, the movable electrode 44 moves in the negative y direction and rotates clockwise about the x axis. The position control electronics 50 can be used to drive fixed electrode 60 with voltage $V_{xznp}$ and fixed electrode 62 with voltage $V_{xznn}$. The function of voltages $V_{xznp}$ and $V_{xznn}$ is discussed in greater detail above.

Similarly, fixed electrode 64, designated xzpp, and fixed electrode 66, designated xzpn, are mounted in opposition about the free floating movable electrode 44. The fixed electrode pair 64, 66 provides movement of the movable electrode 44 in the positive y direction when the voltage on fixed electrode 64 exceeds the voltage on fixed electrode 66. With the same polarity of excitation the fixed electrode pair 64, 66 rotates the movable electrode 44 in the clockwise direction about the x axis. When the voltage on fixed electrode 64 is less than the voltage on fixed electrode 66, the movable electrode 44 moves in the negative y direction and rotates counterclockwise about the x axis. The position control electronics 50 again can be used to drive fixed electrode 64 with voltage $V_{xzpp}$ and fixed electrode 66 with voltage $V_{xzpn}$. The function of voltages $V_{xzpp}$ and $V_{xzpn}$ is described in greater detail above.

Similarly, fixed electrode 68, designated yxnp, and fixed electrode 70 (see FIG. 4), designated yxnn, are mounted in opposition about the free floating movable electrode 44. The fixed electrode pair 68, 70 provides movement of the movable electrode 44 in the positive z direction when the voltage on fixed electrode 68 exceeds the voltage on fixed electrode 70. With the same polarity of excitation the fixed electrode pair 68, 70 rotates the movable electrode 44 in the counterclockwise direction about the y axis. When the voltage on fixed electrode 68 is less than the voltage on fixed electrode 70, the movable electrode assembly 44 moves in the negative z direction and rotates clockwise about the y axis. The position control electronics 50 can be used to drive fixed electrode 68 with voltage $V_{yxnp}$ and fixed electrode 70 with voltage $V_{yxnn}$. The function of voltages $V_{yxnp}$ and $V_{yxnn}$ is discussed in greater detail above.

Again, fixed electrode 72, designated yxpp, and fixed electrode 74, designated yxpn, are mounted in opposition about the free floating movable electrode 44. The fixed electrode pair 72, 74 provides movement of the movable electrode 44 in the positive z direction when the voltage on fixed electrode 72 exceeds the voltage on fixed electrode 74. With the same polarity of excitation the fixed electrode pair 72, 74 rotates the movable electrode 44 in the clockwise direction about the y axis. When the voltage on fixed electrode 72 is less than the voltage on fixed electrode 74, the movable electrode 44 moves in the negative z direction and rotates counterclockwise about the y axis. The position control electronics 50 can be used to drive fixed electrode 72, with voltage $V_{yxpp}$ and fixed electrode 74, with voltage $V_{yxnn}$. The function of voltages $V_{yxpp}$ and $V_{yxnn}$ is described in greater detail above.

In this embodiment, control voltages are individually applied to fixed electrodes 52, 54, 56, 58, 60, 62, 64, 66, 68, 70, 72 and 74 via position control electronics 50 of processor system 34 to control the positioning of movable electrode 44. Feedback can be provided via inputs to signal processor 48 from the fixed electrodes and/or the movable electrode.

Figure 5:
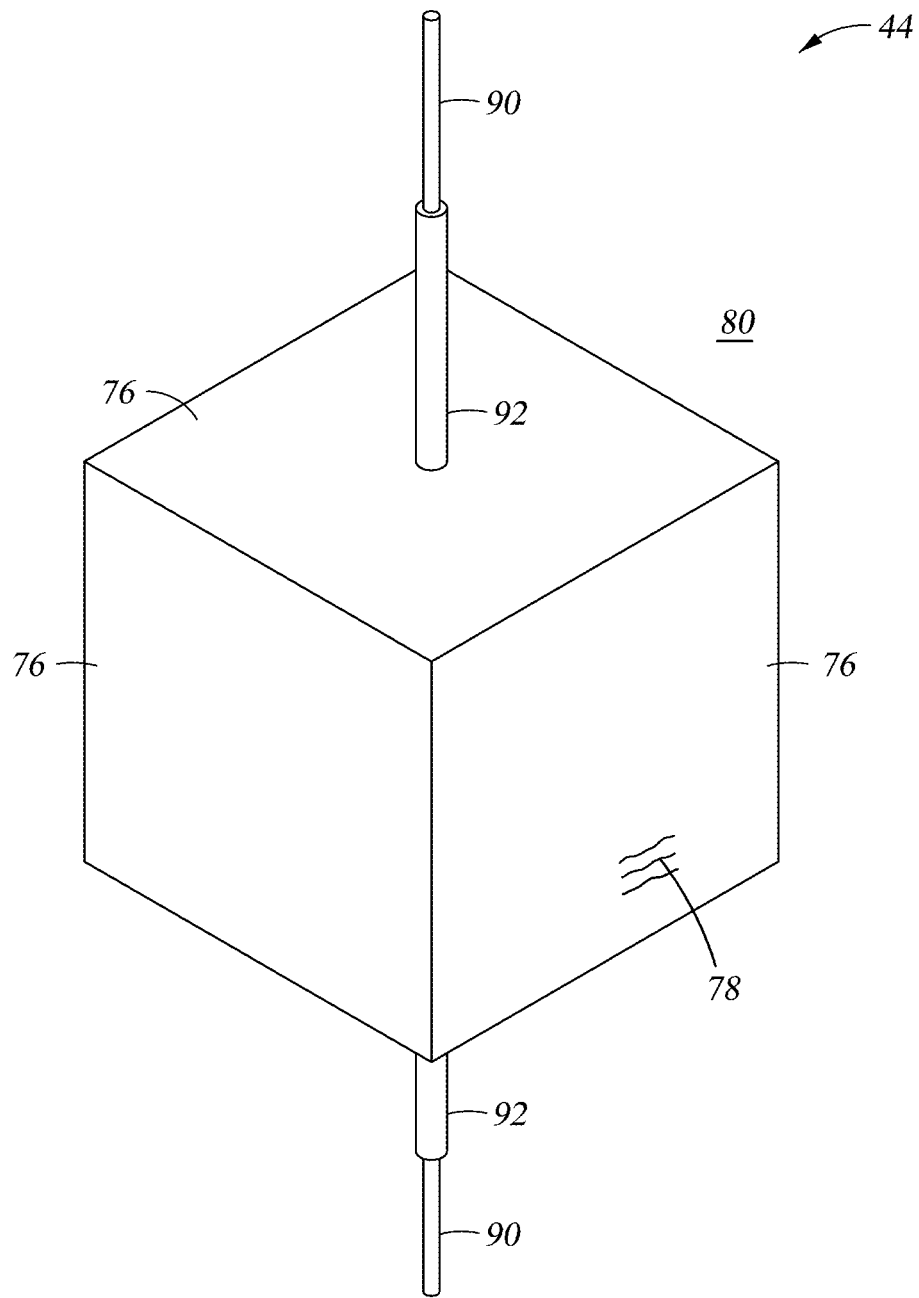
FIG. 5 is a schematic view of apparatus according to one or more aspects of the present disclosure.

Depending on the application, movable electrode 44 also can be constructed in a variety of shapes, sizes and configurations with one or more components. Referring generally to FIG. 5, one example of movable electrode 44 is illustrated. In this embodiment, movable electrode 44 comprises a plurality of sides 76 with opposing sides being generally parallel. By way of example, the plurality of sides 76 may comprise six sides to form a box, such as a cube. The sides 76 may be covered with a conductive material 78 that provides the outside of the movable electrode with an equal potential voltage $V_0$. The multisided electrode illustrated in this embodiment also can be formed as a shell with a hollow interior. The hollow interior lowers the density of the movable electrode and can facilitate buoyancy when the movable electrode 44 is positioned in a liquid 80.

Figure 6:
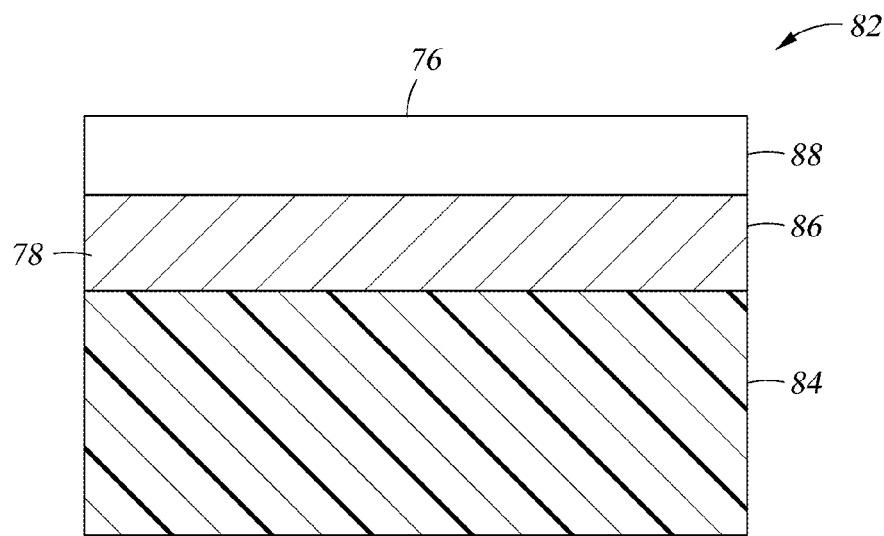
FIG. 6 is a sectional view of the apparatus shown in FIG. 5.

With additional reference to FIG. 6, a hollow embodiment of electrode 44 comprises a wall 82 forming the shell of movable electrode 44. The wall 82 may be formed of various materials and may comprise a substrate 84. In this embodiment, an electrically conductive layer 86 is positioned adjacent substrate 84, and an outer protective layer 88 is positioned adjacent conductive layer 86 opposite substrate 84. The conductive layer 86 may be a coating applied to substrate 84, and the outer protective layer 88 may be a dielectric coating applied to conductive layer 86. The electrically conductive layer 86 is held at a voltage potential $V_0$ and also is capacitively driven by the position sensing signals via the fixed electrodes 46. The outer dielectric layer 88 prevents the electrically conductive layer 86 from electrically shorting, at low-frequency, to the fixed electrodes 46. Consequently, electrostatic forces can develop between the electrically conductive layer 86 and the fixed electrodes 46. The conductive layer 86 serves as the active element of the movable electrode 44 that provides the potential $V_0$ for creation of electrostatic forces between the voltages of the fixed electrodes 46 and the movable electrode 44.

By way of example, conductive layer 86 may be a conductive coating comprised of a thin metallization layer applied to the outside of substrate 84. The electrically conductive coating covers every side of the multisided movable electrode 44 illustrated in this embodiment. Also, the outer protective layer 88 may be a dielectric coating that covers every side of the multisided electrode 44 external to the electrically conductive coating 86.

Figure 7:
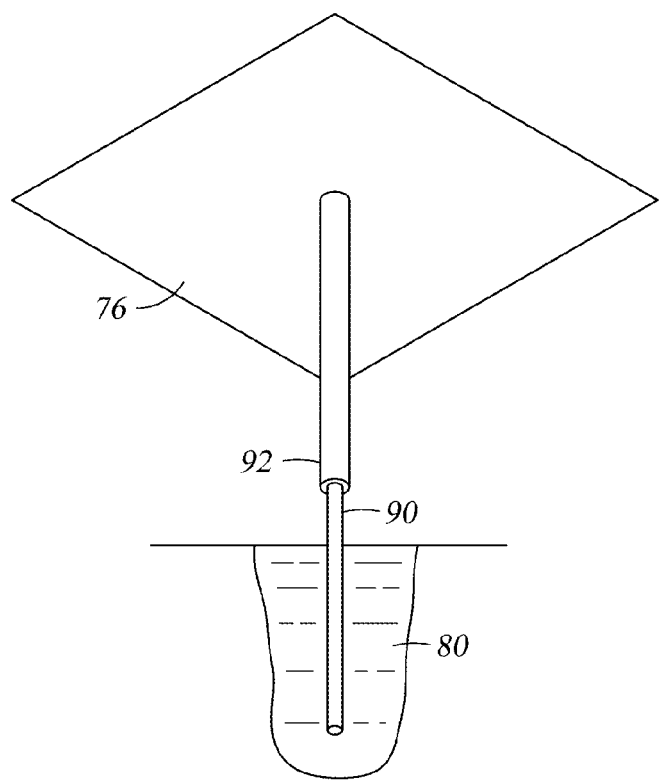
FIG. 7 is a schematic view of apparatus according to one or more aspects of the present disclosure.
Figure 8:
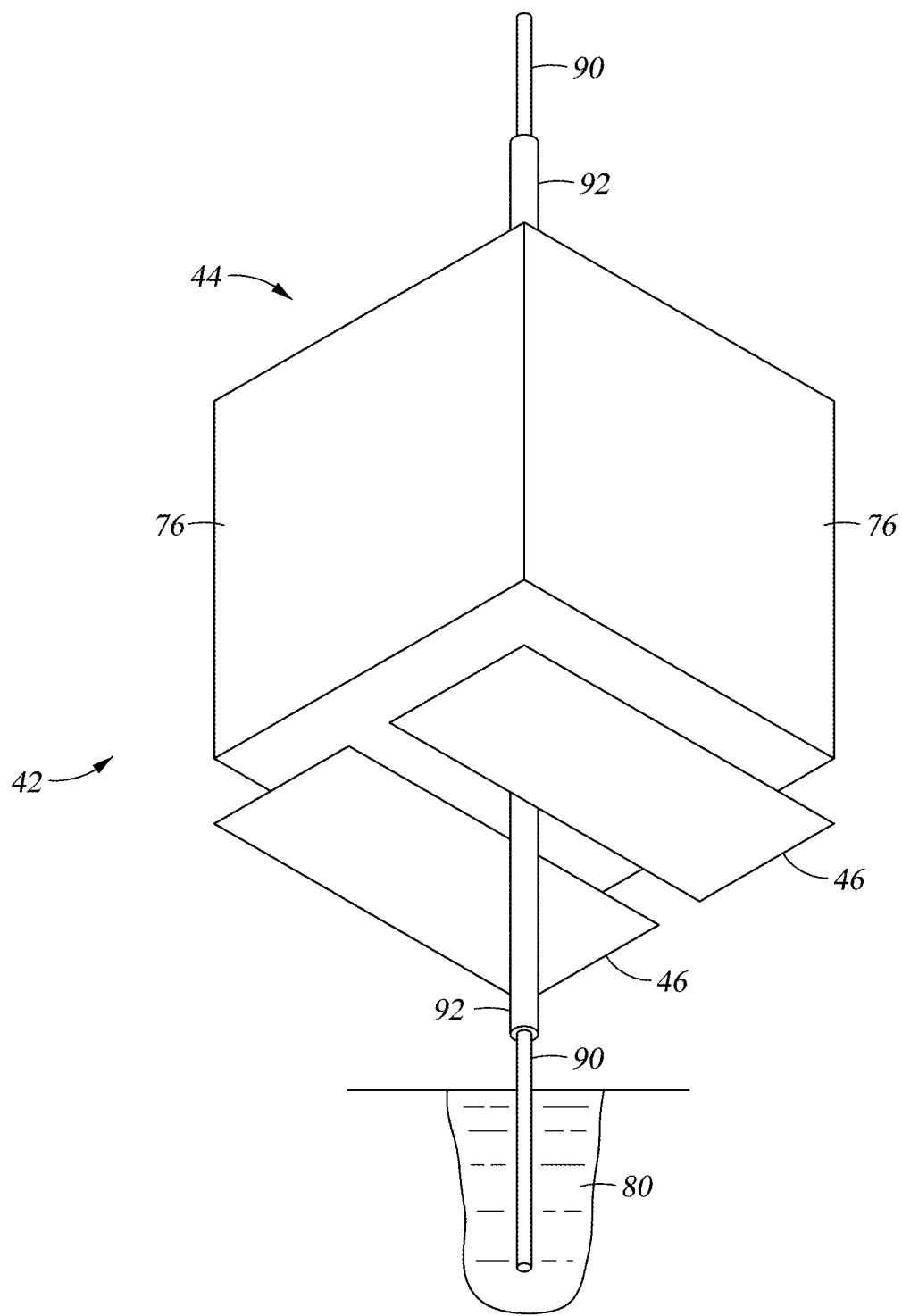
FIG. 8 is a schematic view of apparatus according to one or more aspects of the present disclosure.

With additional reference to FIGS. 7 and 8, the electrically conductive coating 86 can be electrically coupled with a conductive pin 90 that is partially insulated by a pin insulator 92. In this particular embodiment, electrically conductive pin 90 is disposed on at least two opposing sides 76 of the movable electrode 44. The pin insulators 92 prevent the electrically conductive pins 90 from shorting to the fixed electrodes 46.

Each electrically conductive pin 90 may protrude through a pair of adjacent fixed electrodes 46 to make contact with an electrically conductive liquid, e.g., liquid 80, as illustrated in FIG. 8. The electrically conductive pins 90 protrude through the fixed electrodes without making contact. Furthermore, the electrically conductive liquid 80 drives the electrically conductive pin 90 and the electrically conductive layer 86 to a voltage $V_0$ according to the teachings above. The electrically conductive liquid 80 also receives from the electrically conductive pin 90 and the electrically conductive layer 86 the electrical summation of capacitively induced position sensing voltages from the fixed electrodes 46. In this embodiment, the conductive fluid 80 serves as the medium by which the static potential $V_0$ is set upon the movable electrode 44 and also the medium by which the position of the movable electrode 44 is measured.

The position of the movable electrode 44 is measured using the high frequency components of the fixed electrode signals which are received via the variable capacitance between the fixed electrodes 46 and the movable electrode 44 and by gathering the orthogonal position measurement signals from the high frequency electrical signal on the conductive liquid 80. The position control electronics 50 that is used to control the movable electrode measures the movable electrode position via the signal on the conductive liquid 80 and then drives voltages on the fixed electrodes 46 to center the movable electrode 44 through electrostatic attraction forces. The fixed electrode voltages on electrodes 46 are passed to the signal processor 48 which determines, e.g., calculates, a gravity measurement from the individual voltages on the fixed electrodes.

The system and methodology described herein may be utilized in a variety of applications and environments. Additionally, the components and construction of the gravity and acceleration sensor, the tool with which the sensor is used, and the overall system 20 can vary between applications and environments. Additionally, the force sensor and the cooperating equipment can be used in many types of procedures. By levitating the movable electrode of a known mass, for example, the force exerted by gravity and/or acceleration can be detected in many environments via the counterbalancing electrostatic force exerted through the fixed electrodes.

Additionally, the system and methodology can be used to measure the force of gravity and/or acceleration in one, two, three or more dimensions. In simple applications, the force of gravity and/or acceleration can be measured with two fixed electrodes in an electrode pair for one-dimensional electrostatic levitation of the movable electrode. Similarly, an alternate embodiment can be used to measure the force of gravity and/or acceleration with four fixed electrodes in two electrode pairs for the two-dimensional electrostatic levitation of the movable electrode. In other applications, the force of gravity and/or acceleration can be measured with six fixed electrodes in three electrode pairs for the three-dimensional electrostatic levitation of the movable electrode. Additional electrode pairs can be added, as described above, to measure forces in additional dimensions, both linear and rotational.

Furthermore, movement of the movable electrode 44 can be facilitated in some applications by positioning the movable electrode in a fluid, such as a dielectric liquid, that subjects the movable electrode to a buoyant force. In these applications, the buoyant force enables the movable electrode to float freely which reduces the electrostatic force required to levitate the movable electrode against the force of gravity or acceleration. In some applications, a pool of electrically conducting fluid can be isolated from the fixed electrodes; and/or a non-electrically conducting dielectric fluid or gas can be used to increase the permittivity of the space between the levitating movable electrode and the fixed electrodes, thereby increasing the electrostatic force for a given fixed electrode voltage. The fluid may be positioned, for example, in the gimbaled vessel containing the electrostatic force engine. In some embodiments, the vessel or other portions of the sensor can be temperature controlled, and various mechanisms, bearings and other devices can be used to facilitate movement of the gimbaled vessel.

In view of all of the above and the Figures, it should be evident to those of skill in the art that the present disclosure introduces a system for measuring forces of gravity and acceleration in a wellbore, the system comprising a well tool having a gravity and acceleration sensor, the gravity and acceleration sensor comprising a movable electrode having a known mass and a plurality of fixed electrodes mounted about the movable electrode, wherein the movable electrode is levitated between the plurality of fixed electrodes to enable detection of gravitation forces and acceleration forces acting on the movable electrode, the movable electrode being levitated via application of voltages to the fixed electrodes. The gravity and acceleration sensor may be configured to measure force in at least three dimensions. The system may further comprise a control system coupled to the gravity and acceleration sensor. The control system may be configured to control the voltage between opposing fixed electrodes of the plurality of fixed electrodes. The plurality of fixed electrodes may comprise a plurality of fixed electrode pairs with each fixed electrode pair being electrically isolated from the other fixed electrode pairs. The control system may be configured to apply a voltage on the movable electrode while the movable electrode is levitated in a fluid. The control system may comprise a signal processor configured to process signals received from the plurality of fixed electrodes and the movable electrode. The plurality of fixed electrodes may comprise two fixed electrodes arranged in an opposing electrode pair for one-dimensional electrostatic levitation of the movable electrode. The plurality of fixed electrodes may comprise four fixed electrodes arranged in two opposing electrode pairs for two-dimensional electrostatic levitation of the movable electrode. The plurality of fixed electrodes may comprise six fixed electrodes arranged in three opposing electrode pairs for three-dimensional electrostatic levitation of the movable electrode. The plurality of fixed electrodes may comprise twelve fixed electrodes arranged in six opposing electrode pairs for levitation of the movable electrode with respect to three linear dimensions of motion and three rotational dimensions of motion. The plurality of fixed electrodes may be fixed with respect to a gimbaled vessel mounted in the well tool.

The present disclosure also introduces a method for measuring forces resulting from gravity or acceleration in a wellbore, comprising: mounting fixed electrodes around a movable electrode to create a sensor configured to detect gravity or acceleration; connecting a control system to the fixed electrodes to detect relative movement of the movable electrode; levitating the movable electrode with the fixed electrodes; and deploying the sensor into a wellbore. Mounting may comprise mounting the fixed electrodes as opposing fixed electrode pairs. Connecting may comprise connecting a proportional integral differential controller. Levitating may comprise applying a voltage to the fixed electrodes to create an electrostatic force. The method may further comprise mounting the fixed electrodes within a gimbaled vessel.

The present disclosure also introduces a device comprising a tool for measuring gravity or acceleration, the tool comprising a movable electrode having a predetermined mass and a plurality of adjacent electrodes arranged along the movable electrode, the adjacent electrodes being positioned to levitate the movable electrode by exerting an electrostatic force upon application of a suitable voltage signal to the adjacent electrodes. A voltage signal may also be applied to the movable electrode. The movable electrode may float in a dielectric fluid. The adjacent electrodes may be fixed within a gimbaled vessel in opposing pairs. The opposing pairs may comprise at least six opposing pairs.

The present disclosure also introduces a method comprising: forming a force sensor with a movable electrode levitated by a plurality of surrounding electrodes; coupling a control system to the plurality of surrounding electrodes; using the control system to apply voltages to the surrounding electrodes in a manner that levitates the movable electrode; and moving the force sensor into a desired environment to measure forces incurred. Forming may comprise positioning the surrounding electrodes in opposing fixed pairs to measure the force of gravity and acceleration in a plurality of dimensions.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions and alterations herein without departing from the spirit and scope of the present disclosure.

The Abstract at the end of this disclosure is provided to comply with 37 C.F.R. §1.72(b) to allow the reader to quickly ascertain the nature of the technical disclosure. It is submitted with the understanding that it will not be used to interpret or limit the scope or meaning of the claims.

What is claimed is:

1. A system for measuring forces of gravity and acceleration in a wellbore, comprising: a well tool having a gravity and acceleration sensor, the gravity and acceleration sensor comprising a movable electrode having a known mass and a plurality of fixed electrodes mounted about the movable electrode, wherein the movable electrode is levitated between the plurality of fixed electrodes to enable detection of gravitation forces and acceleration forces acting on the movable electrode, the movable electrode being levitated via application of voltages to the fixed electrodes.

2. The system of claim 1 wherein the gravity and acceleration sensor is configured to measure force in at least three dimensions.

3. The system of claim 1 further comprising a control system coupled to the gravity and acceleration sensor.

4. The system of claim 3 wherein the control system is configured to control the voltage between opposing fixed electrodes of the plurality of fixed electrodes.

5. The system of claim 1 wherein the plurality of fixed electrodes comprises a plurality of fixed electrode pairs with each fixed electrode pair being electrically isolated from the other fixed electrode pairs.

6. The system of claim 3 wherein the control system is configured to apply a voltage on the movable electrode while the movable electrode is levitated in a fluid.

7. The system of claim 3 wherein the control system comprises a signal processor configured to process signals received from the plurality of fixed electrodes and the movable electrode.

8. The system of claim 1 wherein the plurality of fixed electrodes comprises two fixed electrodes arranged in an opposing electrode pair for one-dimensional electrostatic levitation of the movable electrode.

9. The system of claim 1 wherein the plurality of fixed electrodes comprises four fixed electrodes arranged in two opposing electrode pairs for two-dimensional electrostatic levitation of the movable electrode.

10. The system of claim 1 wherein the plurality of fixed electrodes comprises six fixed electrodes arranged in three opposing electrode pairs for three-dimensional electrostatic levitation of the movable electrode.

11. The system of claim 1 wherein the plurality of fixed electrodes comprises twelve fixed electrodes arranged in six opposing electrode pairs for levitation of the movable electrode with respect to three linear dimensions of motion and three rotational dimensions of motion.

12. The system of claim 1 wherein the plurality of fixed electrodes is fixed with respect to a gimbaled vessel mounted in the well tool.

13. A method for measuring forces resulting in a wellbore, comprising: mounting fixed electrodes around a movable electrode to create a sensor configured to detect gravity or acceleration; connecting a control system to the fixed electrodes to detect relative movement of the movable electrode; levitating the movable electrode with the fixed electrodes; and deploying the sensor into a wellbore.

14. The method of claim 13 wherein mounting comprises mounting the fixed electrodes as opposing fixed electrode pairs.

15. The method of claim 13 wherein connecting comprises connecting a proportional integral differential controller.

16. The method of claim 13 wherein levitating comprises applying a voltage to the fixed electrodes to create an electrostatic force.

17. The method of claim 14 further comprising mounting the fixed electrodes within a gimbaled vessel.

18. A device, comprising: a tool for measuring gravity or acceleration, the tool comprising a movable electrode having a predetermined mass and a plurality of adjacent electrodes arranged along the movable electrode, the adjacent electrodes being positioned to levitate the movable electrode by exerting an electrostatic force upon application of a suitable voltage signal to the adjacent electrodes; wherein the adjacent electrodes are fixed within a gimbaled vessel in opposing pairs.

19. The device of claim 18 wherein a voltage signal also is applied to the movable electrode.

20. The device of claim 18 wherein the movable electrode floats in a dielectric fluid.

21. The device of claim 18 wherein the opposing pairs comprise at least six opposing pairs.

* * * * *